(12) United States Patent
Sugimoto et al.

(10) Patent No.: US 11,705,792 B2
(45) Date of Patent: Jul. 18, 2023

(54) COIL INSERTION DEVICE AND COIL INSERTION METHOD

(71) Applicant: NITTOKU Co., Ltd., Saitama (JP)

(72) Inventors: Shinji Sugimoto, Fukushima (JP); Takayuki Hasebe, Nakatsugawa (JP)

(73) Assignee: NITTOKU CO., LTD., Saitama (JP)

( * ) Notice: Subject to any disclaimer, the term of this patent is extended or adjusted under 35 U.S.C. 154(b) by 297 days.

(21) Appl. No.: 17/293,007

(22) PCT Filed: Apr. 14, 2020

(86) PCT No.: PCT/JP2020/016452
§ 371 (c)(1),
(2) Date: May 11, 2021

(87) PCT Pub. No.: WO2020/226036
PCT Pub. Date: Nov. 12, 2020

(65) Prior Publication Data
US 2021/0408878 A1    Dec. 30, 2021

(30) Foreign Application Priority Data
May 9, 2019 (JP) ................ 2019-088810

(51) Int. Cl.
*H02K 15/06* (2006.01)

(52) U.S. Cl.
CPC .......... *H02K 15/06* (2013.01); *H02K 15/066* (2013.01); *Y10T 29/49009* (2015.01); *Y10T 29/49073* (2015.01); *Y10T 29/53143* (2015.01); *Y10T 29/53161* (2015.01)

(58) Field of Classification Search
CPC ......... Y10T 29/49009; Y10T 29/49073; Y10T 29/53143; Y10T 29/53157; Y10T 29/53161; H02K 15/06; H02K 15/062; H02K 15/063; H02K 15/065; H02K 15/066; H02K 15/085
See application file for complete search history.

(56) References Cited

U.S. PATENT DOCUMENTS

| | | | |
|---|---|---|---|
| 2005/0005422 A1* | 1/2005 | Kuroyanagi | H02K 15/0442 29/596 |
| 2007/0143983 A1 | 6/2007 | Yamaguchi et al. | |
| 2011/0260572 A1* | 10/2011 | Hiraga | H02K 15/068 310/215 |

(Continued)

FOREIGN PATENT DOCUMENTS

| | | |
|---|---|---|
| EP | 1526630 | 4/2005 |
| JP | S5594567 A | 7/1980 |

(Continued)

*Primary Examiner* — Peter Dungba Vo
*Assistant Examiner* — Joshua D Anderson
(74) *Attorney, Agent, or Firm* — Rabin & Berdo, P.C.

(57) ABSTRACT

A coil insertion device includes: a pair of delivery jigs respectively formed with slits into which a pair of side portions of a coil that are parallel with each other can be inserted; and a side portion inserting mechanism configured to push out the side portions inserted into the slits from the slits to insert the side portions into slots of a stator core, the slots facing the slits, the side portion inserting mechanism has: pushing blocks inserted into the slits; and a pushing block moving mechanism configured to move the pushing blocks in a depth direction of the slits.

9 Claims, 20 Drawing Sheets

(56) References Cited

U.S. PATENT DOCUMENTS

2013/0009509 A1    1/2013  Tsuge et al.
2018/0166955 A1*   6/2018  Kajita .................. H02K 15/066

FOREIGN PATENT DOCUMENTS

| JP | 2004064990 A | 2/2004 |
| JP | 2007-166850 A | 6/2007 |
| JP | 2011-229285 A | 11/2011 |

* cited by examiner

COIL INSERTION DEVICE AND COIL INSERTION METHOD

TECHNICAL FIELD

The present invention relates to a coil insertion device and a coil insertion method for inserting coils into a stator core of a dynamo-electric machine.

BACKGROUND ART

Conventionally, a stator of a dynamo-electric machine is provided with: a cylinder shaped stator core having a plurality of teeth (magnetic poles) that are arranged in a radiating pattern so as to project radially inward directions and a plurality of slots that respectively open therebetween; and coils that are assembled to the stator core by being received in the slots at side portions thereof. For the assembly of the coils, there is a known method in which the coils are formed separately from the stator core in advance, and the side portions of the coils are inserted into the respective slots of the stator core.

As a coil insertion method, as shown in FIG. 22, JP2007-166850A and JP2011-229285A have proposed methods using a columnar jig 3 that is formed to have a plurality of holding grooves 3a corresponding to slots 2a of a stator core 2 on an outer circumference, the method including: a step of arranging a plurality of pre-wound coils 4 along a circumference of the jig 3 by respectively inserting a pair of side portions 4a and 4b of each of the coils 4 into the holding grooves 3a; a step of inserting the jig 3 to an inner circumference of the stator core 2, aligning the holding grooves 3a with respect to the slots 2a of the stator core 2 so as to match with the corresponding slots 2a, and subsequently, inserting plate-shaped pushers 5, which are formed such that their widths become narrower towards tip ends, to the holding grooves 3a from the tip ends; and a step of pushing the pairs of side portions 4a and 4b of the respective coils 4 that have been inserted into the holding grooves 3a radially outwards and inserting the pairs of side portions 4a and 4b into the corresponding slots 2a of the stator core 2.

In the above, the coils 4 that are formed separately from the stator core 2 in advance can be each obtained by winding a wire rod around a winding core, and each of the coils 4 has the pair of side portions 4a and 4b that are parallel with each other and that are inserted through the holding grooves 3a and running-track shaped coil end portions 4c and 4d that respectively connect both end portions of the pair of respective side portions 4a and 4b so as to form arc shapes.

The coils 4 that are formed in advance are coils each having a tubular shape formed by performing so called normal winding in which the wire rod is spirally wound around the winding core without forming gaps such that a further winding wire having the running-track shape is stacked in its axial direction over the winding wire having the running-track shape so as to be extended in the stacking direction.

SUMMARY OF INVENTION

As shown in FIG. 22, in the above-described method, the pushers 5 are inserted from the tip ends to the holding grooves 3a in the longitudinal direction of the holding grooves 3a, and with inclined side surfaces of the pushers 5 being inserted in the longitudinal direction of the holding grooves 3a, the pairs of side portions 4a and 4b of the respective coils 4 that have been inserted into the holding grooves 3a are pushed out radially outwards, i.e. in the depth direction of the holding grooves 3a.

Because the insertion direction of the pushers 5 and the moving directions of the pairs of side portions 4a and 4b are orthogonal to each other, there is a risk in that, as the pushers 5 are inserted, parts of the wire rod forming the pair of side portions 4a and 4b that are brought into contact with the pushers 5 are moved together with the pushers 5 in the insertion direction of the pushers 5, and a degree of alignment of the coils 4 is deteriorated. When the degree of alignment of the wire rod is deteriorated, it becomes difficult to accurately insert the pairs of side portions 4a and 4b into the slots 2a of the stator core 2.

An object of the present invention is to provide a coil insertion device and a coil insertion method capable of inserting coils into slots without deteriorating a degree of alignment.

According to one aspect of the present invention, a coil insertion device includes: a pair of delivery jigs respectively formed with slits into which a pair of side portions of a coil that are parallel with each other can be inserted; and a side portion inserting mechanism configured to push out the side portions inserted into the slits from the slits to insert the side portions into slots of a stator core, the slots facing the slits, the side portion inserting mechanism has: pushing blocks inserted into the slits; and a pushing block moving mechanism configured to move the pushing blocks in a depth direction of the slits.

According to another aspect of the present invention, a coil insertion method includes: a delivery step respectively inserting a pair of side portions of coil into slits respectively formed in a pair of delivery jigs; a jig inserting step of introducing the pair of delivery jigs to an inside of a stator core to cause opening portions of the slits to face opening portions of slots of the stator core; and a side portion inserting step of pushing the side portions of the coil that have been inserted into the slits out from the slits to insert the side portions into the slots of the stator core, in the delivery step, the pair of side portions are respectively inserted into the slits in which pushing blocks have been inserted into bottom portions, and in the side portion inserting step, the side portions are pushed out from the slits by moving the pushing blocks from the bottom portions to the opening portions in the slits.

DESCRIPTION OF EMBODIMENT

Embodiment of the present invention will be described below with reference to the drawings.

Figure 8:
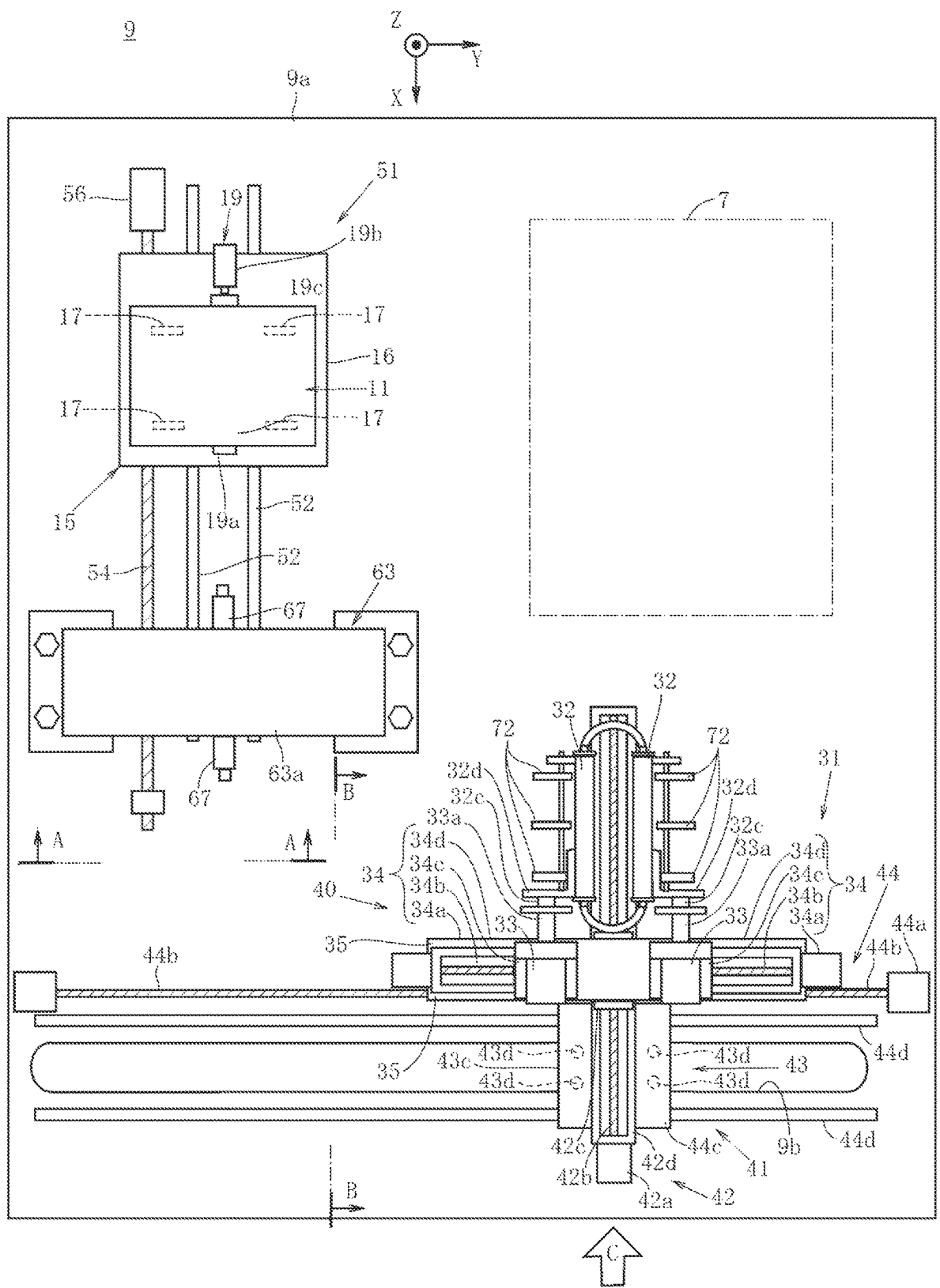
FIG. 8 is a plan view showing the coil insertion device according to the embodiment of the present invention.

FIG. 8 shows a plan view of a coil insertion device 9 according to the embodiment of the present invention. In this figure, three axes X, Y, and Z that are mutually orthogonal are set, and the coil insertion device 9 will be described by stating that the X axis extends in the horizontal transverse direction, the Y axis extends in the horizontal front-rear direction, and the Z axis extends in the vertical direction.

Figure 18:
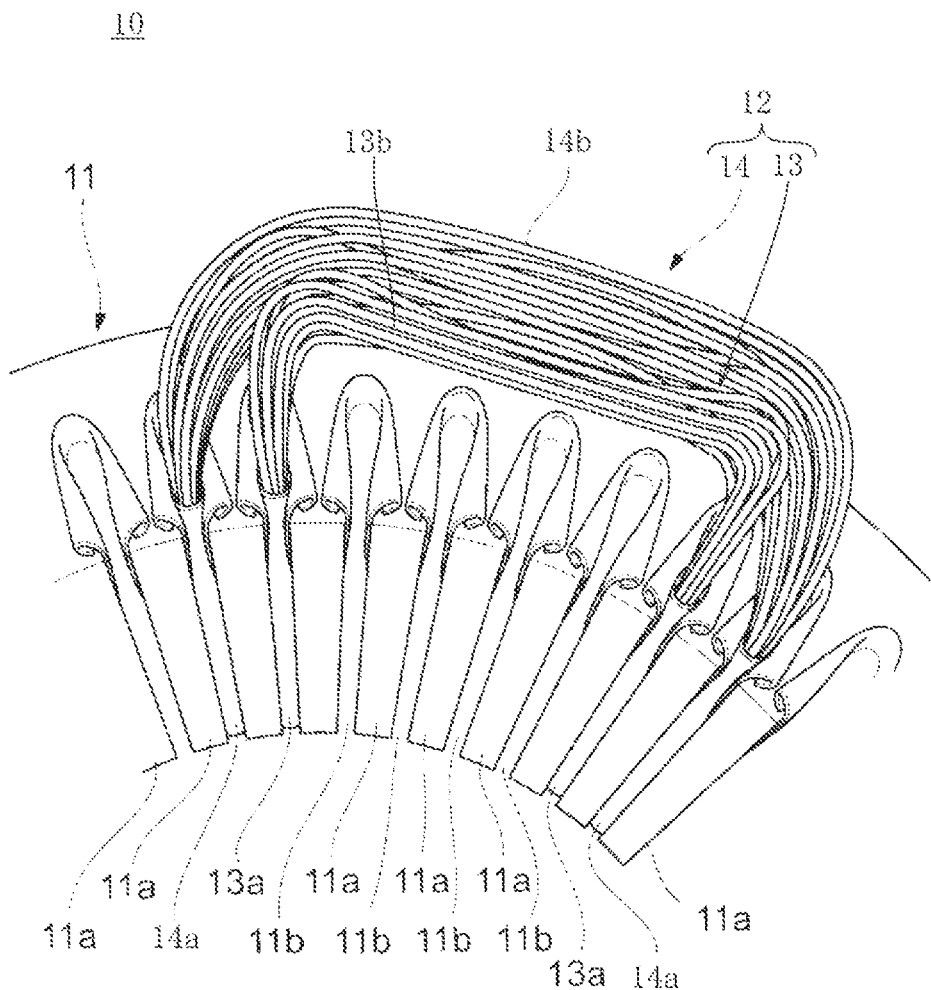
FIG. 18 is a top view showing, in enlarged form, a part of a stator in which the coil having the inner coil and the outer coil is inserted into the slots.
Figure 19:
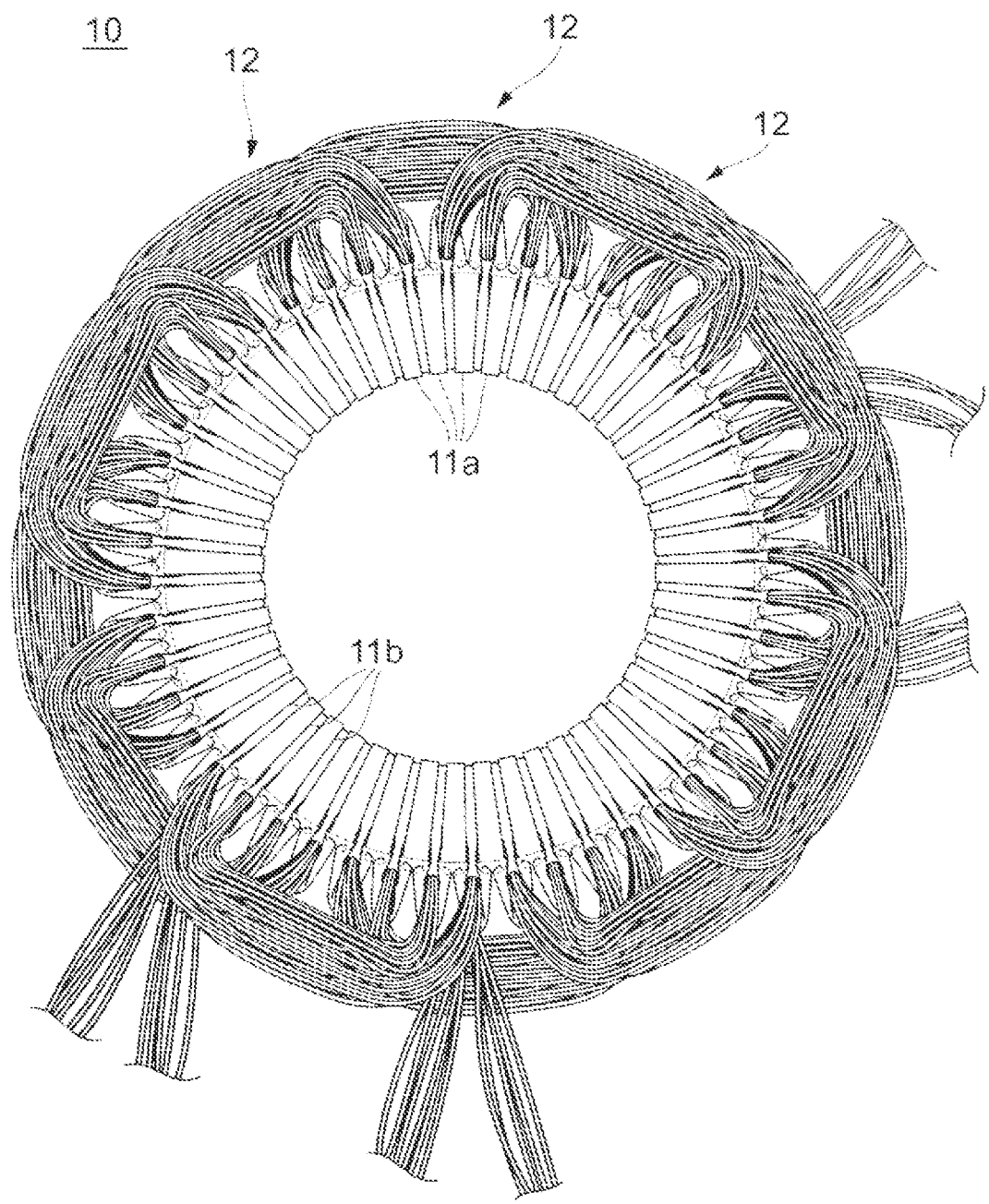
FIG. 19 is a top view showing the stator in which the plurality of coils are mounted to the stator core.

The coil insertion device 9 is used for manufacturing a stator 10 that is used in a power generator or a motor serving as a dynamo-electric machine, and the coil insertion device 9 is used for inserting coils 12 each serving as a stator coil into a stator core 11. As shown in FIGS. 18 and 19, the stator 10 is provided with a plurality of teeth 11a (magnetic poles) that are formed so as to project radially inward directions, the cylinder shaped stator core 11 that has a plurality of slots 11b that open between the teeth 11a, and the coils 12 that are assembled to the stator core 11.

The coil insertion device 9 according to the embodiment of the present invention assembles the coils 12 to the stator core 11, and as shown in FIGS. 1 to 8, the coil insertion device 9 is provided with a support tool 15 that supports the stator core 11. The support tool 15 supports the cylinder shaped stator core 11 such that the center axis of the stator core 11 extends horizontally (in the figures, the center axis coincides with the X axis direction) and such that the stator core 11 is rotatable about the center axis serving as the center of rotation.

Figure 1:
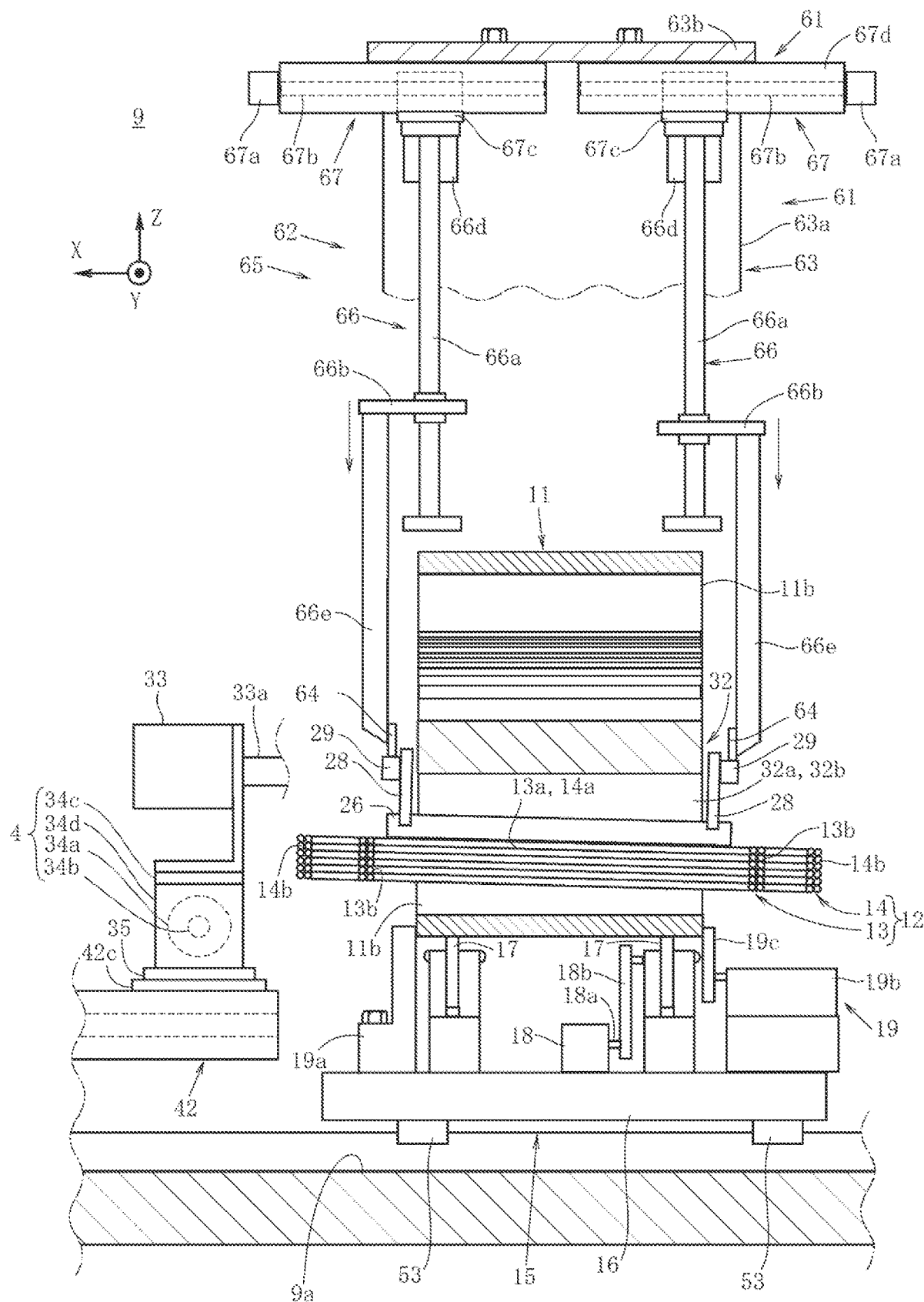
FIG. 1 is a sectional view showing a state in which side portions of coils are respectively inserted from slits into slots in a coil insertion device according to an embodiment of the present invention.
Figure 2:
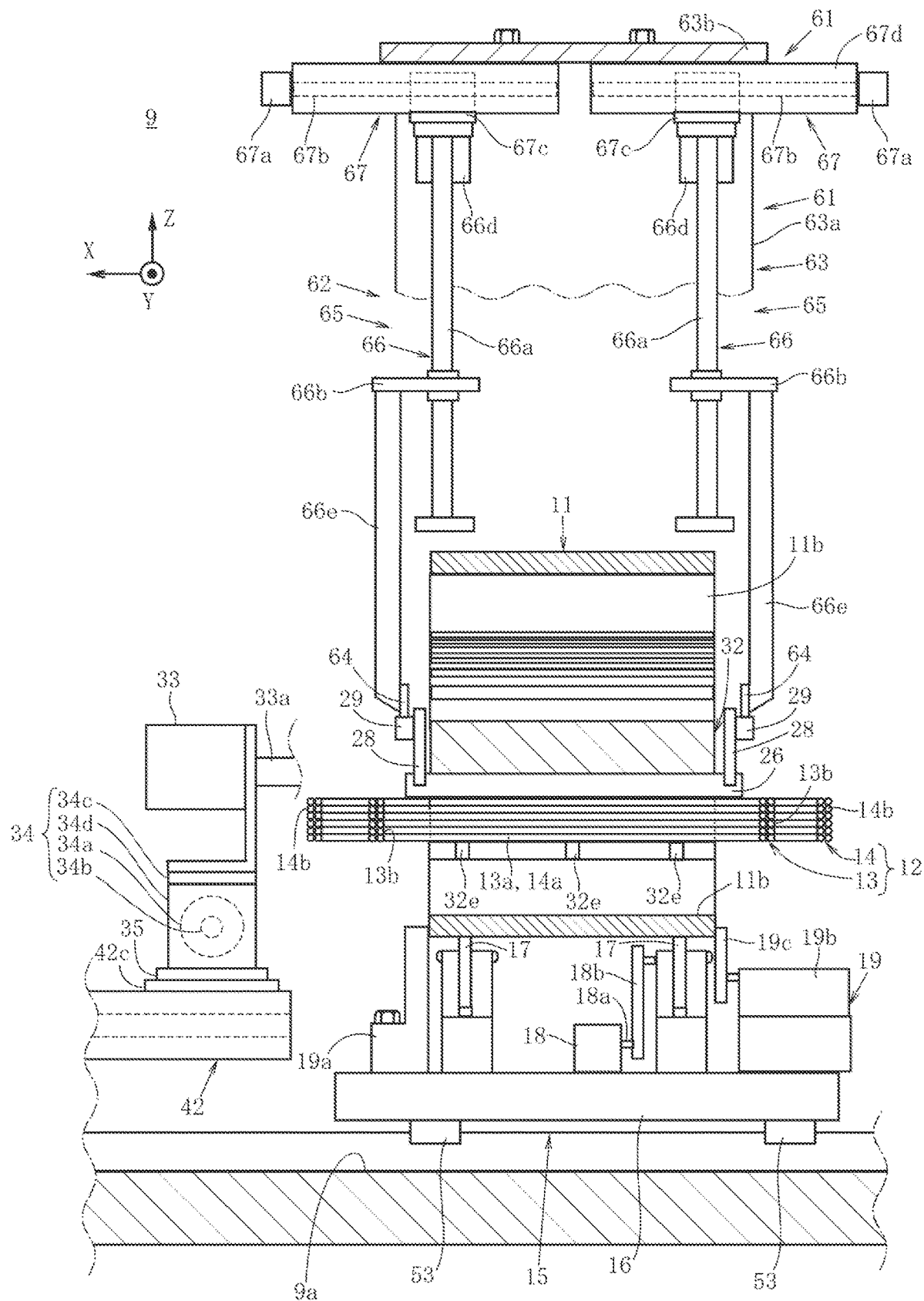
FIG. 2 is a sectional view taken along a line E-E in FIG. 6 in which opening portions of the slits are caused to face opening portions of the slots.

As shown in FIGS. 1 to 10, the support tool 15 is provided with: a horizontal base plate 16; a plurality of pairs of rollers 17, on which the stator core 11 is placed, that are respectively provided on the horizontal base plate 16 with predetermined spaces in the circumferential direction and in the axial direction of the stator core 11; a motor 18 that rotates any of the plurality of pairs of the rollers 17 so as to rotate the stator core 11 (see FIGS. 1 to 5); and a fixing device 19 that prohibits rotation of the stator core 11 by clamping the stator core 11 from both sides in the axial direction (see FIG. 1 to FIG. 2).

As shown in FIGS. 1 to 7, the motor 18 in this embodiment is provided on the horizontal base plate 16, and its rotating shaft 18a is linked to the rollers 17 with a belt 18b. As the motor 18 is driven and the rollers 17 is rotated, the stator core 11 is rotated.

As shown in FIGS. 1 to 4, the fixing device 19 is provided with a contact piece 19a that is provided on the horizontal base plate 16 and is brought into contact with one end surface of the stator core 11 in the axial direction, and an actuator 19b that is provided on the horizontal base plate 16 so as to face other end surface of the stator core 11 in the axial direction. The rotation of the stator core 11 is prohibited by projecting an in/out rod 19c of the actuator 19b and clamping the stator core 11 by the in/out rod 19c with the contact piece 19a from both sides in the axial direction.

Figure 9:
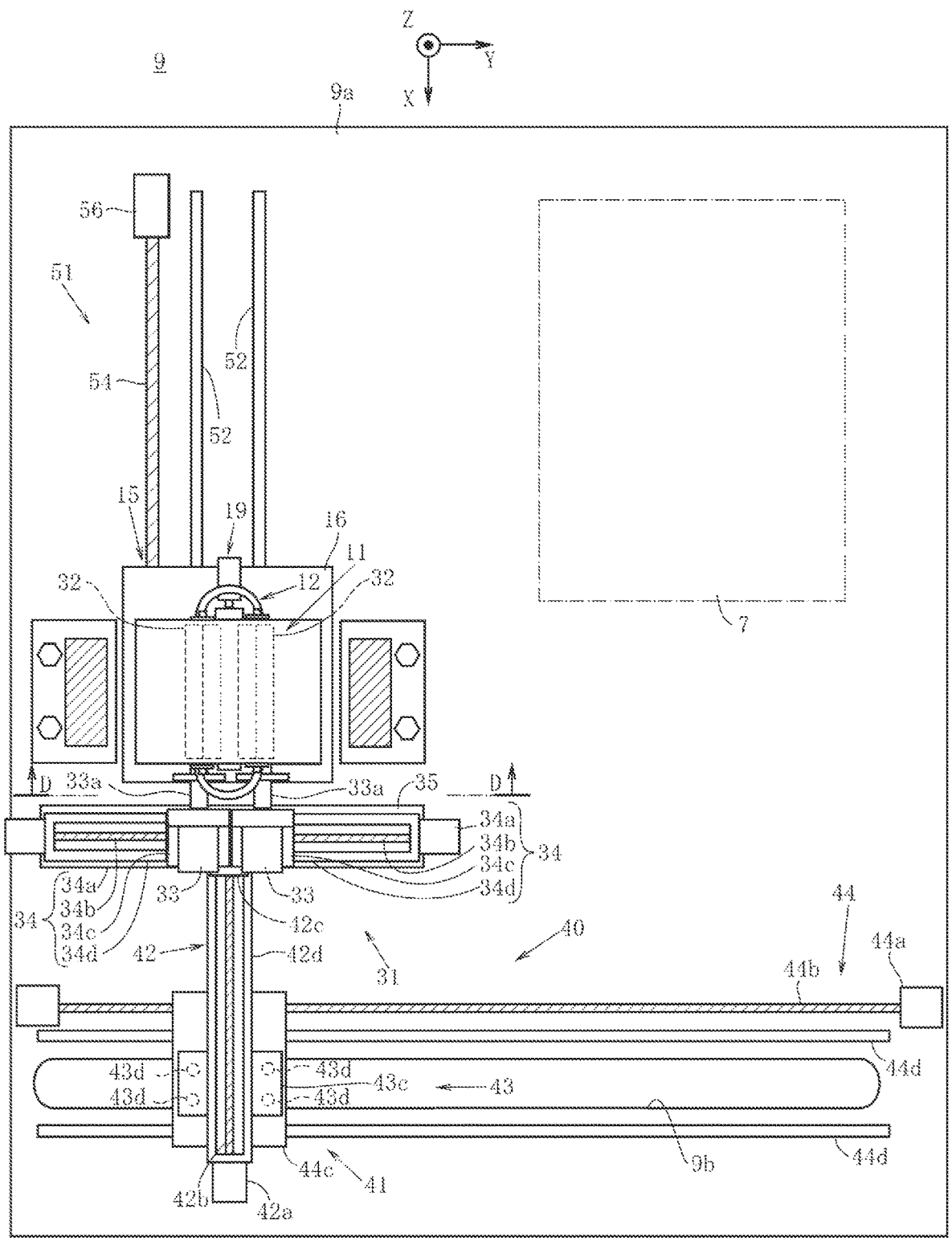
FIG. 9 is a plan view showing a state in which delivery jigs are inserted into the stator core together with the coil.

As shown in FIGS. 8 and 9, the coil insertion device 9 is provided with a core moving mechanism 51 serving as a core moving means that moves, together with the support tool 15, the stator core 11 supported by the support tool 15 in the axial direction of the stator core 11. The core moving mechanism 51 is provided with: rails 52 that are provided on a table 9a so as to extend in the axial direction of the stator core 11 (in the X axis direction) and on which the horizontal base plate 16 is mounted so as to be movable in the longitudinal direction; movable bodies 53 that are provided on the horizontal base plate 16 and that move along the rails 52 (see FIGS. 1 to 7); a ball screw 54 that is provided so as to be parallel relative to the rails 52; a female screw body 55 that is provided on the horizontal base plate 16 and that is threadably engaged with the ball screw 54 (see FIGS. 5 to 7); and a motor 56 that rotates the ball screw 54 to move the horizontal base plate 16 together with the stator core 11 along the rails 52.

The core moving mechanism 51 moves the stator core 11 between a mounting position where the stator core 11 is caused to be supported by the support tool 15 (see FIG. 8) and an entry position where a pair of delivery jigs 32 and 32, which will be described later, can be introduced to the stator core 11 supported by the support tool 15 (see FIG. 9).

Figure 13:
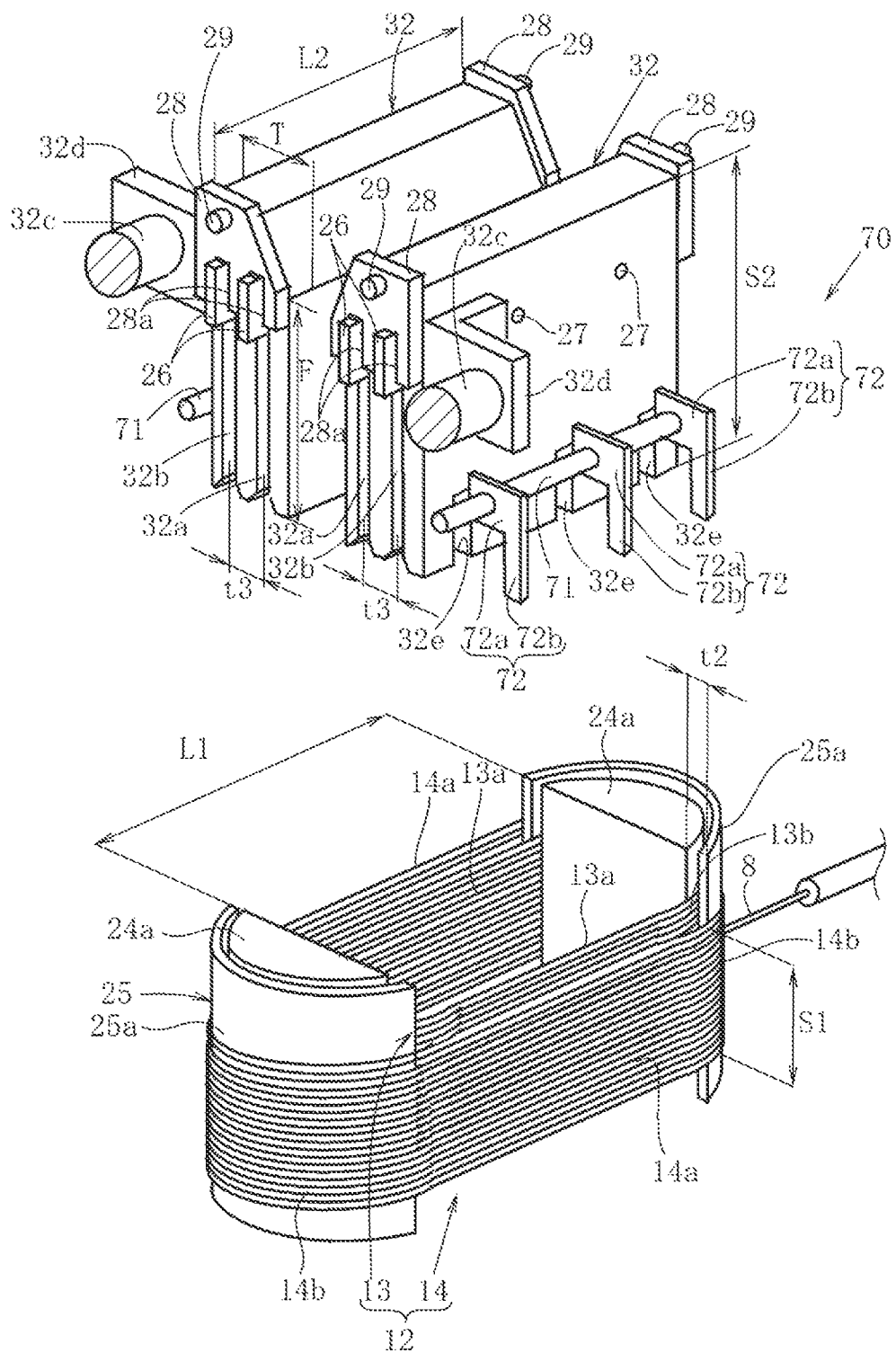
FIG. 13 is a perspective view showing a relationship between the pair of delivery jigs and the coil.

As shown in FIGS. 1 to 8, the coil insertion device 9 is provided with the pair of delivery jigs 32 and 32. As shown in FIG. 13, the pair of delivery jigs 32 and 32 are respectively formed with slits 32a and 32b into which side portions 13a and 14a of the coil 12 can be inserted, respectively. The coil 12 in this embodiment has the pair of side portions 13a and 14a that are parallel with each other, and is formed by winding a wire rod 8 by a wire winding device (not shown).

Figure 17:
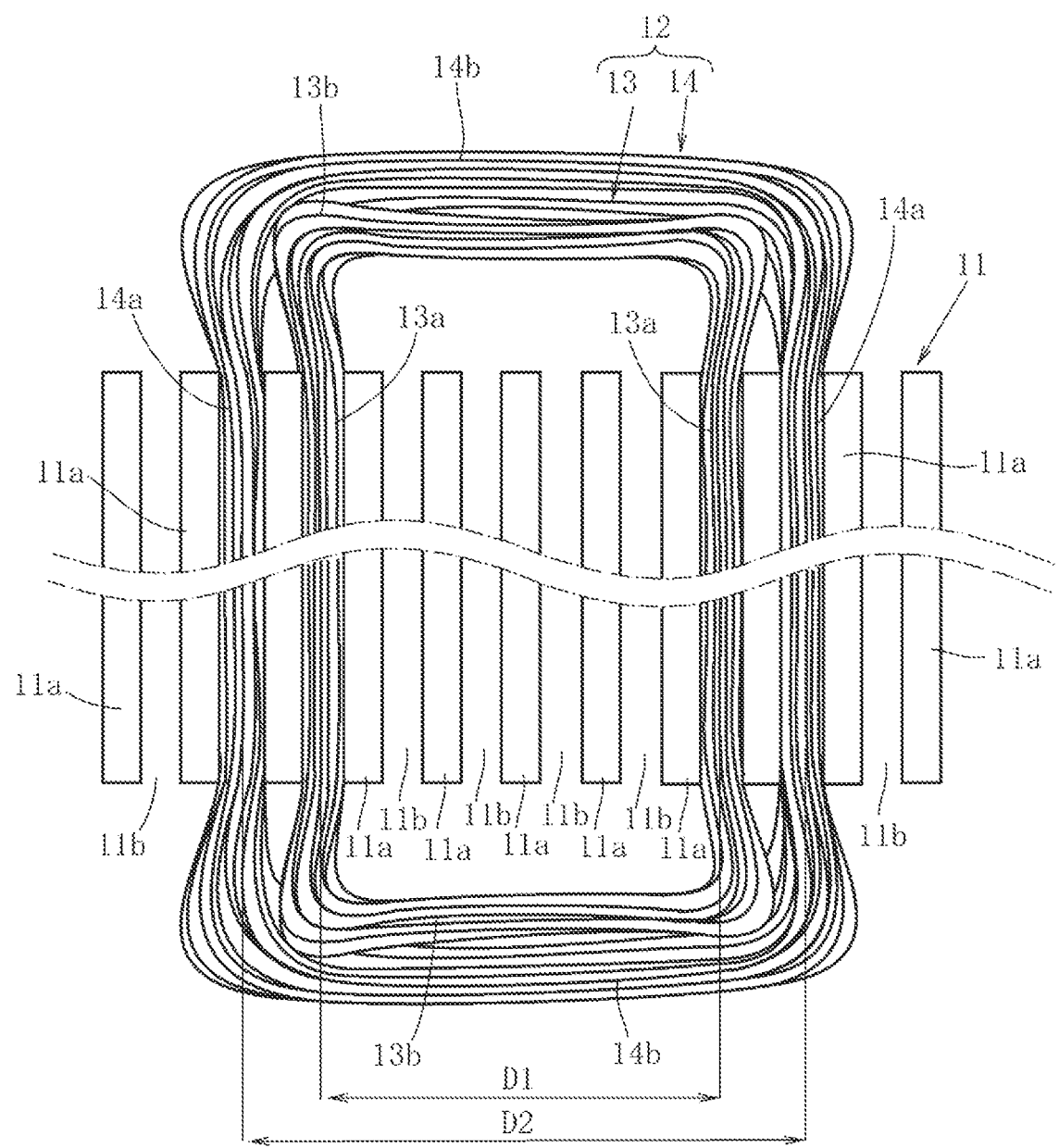
FIG. 17 is a diagram of the stator core, in which the side portions of the coil having an inner coil and an outer coil are inserted into the plurality of slots, viewed from the inside.

In other words, the coil 12 in this embodiment forms a single winding wire layer, and the side portions 13a and 14a are respectively inserted through two adjacent slots 11b of the stator core 11 (see FIG. 17). The coil 12 has an inner coil 13 having a running-track shape that extends in the axial direction and an outer coil 14 that surrounds the inner coil 13 from the outer side with a predetermined gap t2 therebetween.

The inner coil 13 has the pair of side portions 13a and 13a that are parallel with each other and coil end portions 13b that respectively connect both ends of the side portions 13a and 13a so as to form arc shapes. The outer coil 14, which is provided on the outer side of the inner coil 13 so as to form the predetermined gap t2, also has the pair of side portions 14a and 14a that are parallel with each other and coil end portions 14b that respectively connect both ends of the side portions 14a and 14a so as to form arc shapes.

Figure 5:
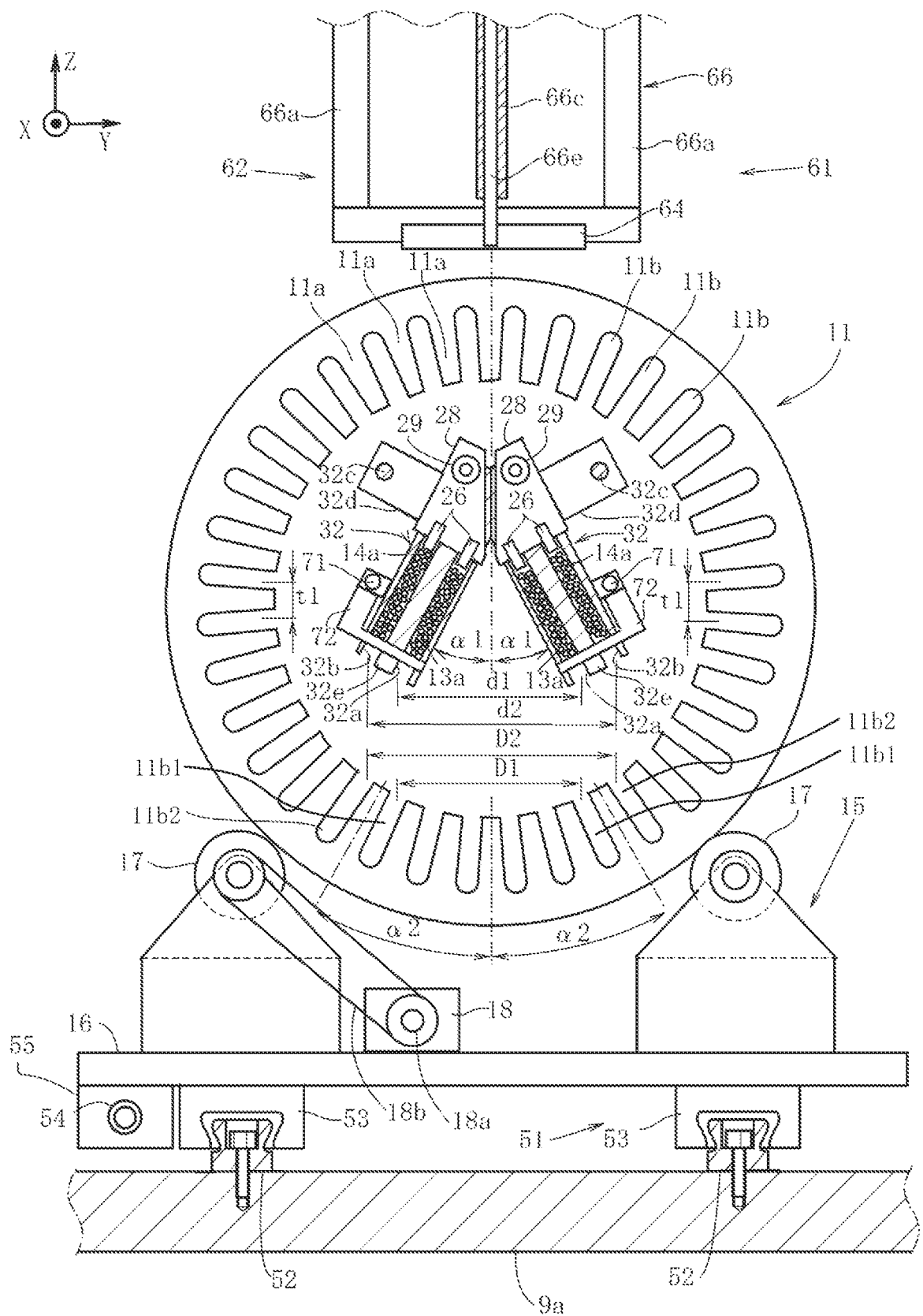
FIG. 5 is a sectional view taken along a line D-D in FIG. 9 showing a state in which a pair of delivery jigs are inserted into a stator core.

In the above, as shown in FIG. 5, the predetermined gap t2 matches with gaps t1 between the adjacent slots 11b of the stator core 11 in the circumferential direction into which the side portions 13a of the inner coil 13 and the side portions 14a of the outer coil 14 are to be inserted.

The pair of delivery jigs 32 and 32 are respectively formed with the slits 32a and 32b, and as shown in FIG. 13, in this embodiment in which the coil 12 consists of the inner coil 13 and the outer coil 14, the pair of delivery jigs 32 and 32 are respectively formed with both of: the inner slits 32a into which the side portions 13a and 13a of the inner coil 13 are inserted; and the outer slits 32b into which the side portions 14a and 14a of the outer coil 14 are inserted. The slits 32a and 32b formed in the pair of delivery jigs 32 and 32 are formed to have widths that respectively allow the insertion of the pair of side portions 13a and 14a of the coil 12 that are parallel with each other.

The coil end portions 13b on both sides of the inner coil 13 are supported by inner winding molds 24a, and the coil end portions 14b on both sides of the outer coil 14 are supported by outer winding molds 25a. As the delivery jig 32, a rectangular plate material having: a length L2 that can be inserted into a space L1 between the inner winding molds 24a and the outer winding molds 25a; a thickness T that is greater than the predetermined gap t2 between the respective side portions 13a and 14a of the coils 13 and 14; and a width S2 that is greater than a length S1 of the respective coils 13 and 14 in the axial direction is used.

A gap t3 between the inner slit 32a and the outer slit 32b matches the predetermined gap t2 between the side portion 13a of the inner coil 13 and the side portion 14a of the outer coil 14. The inner slits 32a and the outer slits 32b are formed so as to extend in the width direction of the delivery jig 32 so as to be parallel with each other and are formed so as to have a depth F that is greater than the lengths S1 of the respective coils 13 and 14 in the axial direction.

Pushing blocks 26 are respectively inserted to the slits 32a and 32b of the pair of delivery jigs 32 and 32. The pushing blocks 26 in this embodiment are rod like components having rectangular cross-sections that are inserted to the slits 32a and 32b, and they are provided such that both ends are respectively projected out from both sides of the delivery jigs 32 and 32 in the longitudinal direction. As shown in FIG. 5, the pushing blocks 26 are formed to have the size that allows, when the pushing blocks 26 are positioned at bottom portions in the slits 32a and 32b so as to be in contact with bottom surfaces of the slits 32a and 32b, the insertion of the respective side portions 13a and 14a of the coil 12 into the remaining portions in the slits 32a and 32b.

In this embodiment, because the pair of slits 32a and 32b are formed in the single delivery jig 32 so as to be parallel with each other, and thus, the pushing blocks 26 are respectively inserted into the slits 32a and 32b. The coil insertion device 9 is provided with temporary fixing mechanisms 27 that are respectively provided on the pair of delivery jigs 32 and 32 and that temporary fix the pushing blocks 26 at the bottom portions in the slits 32a and 32b (see FIG. 16).

Figure 16:
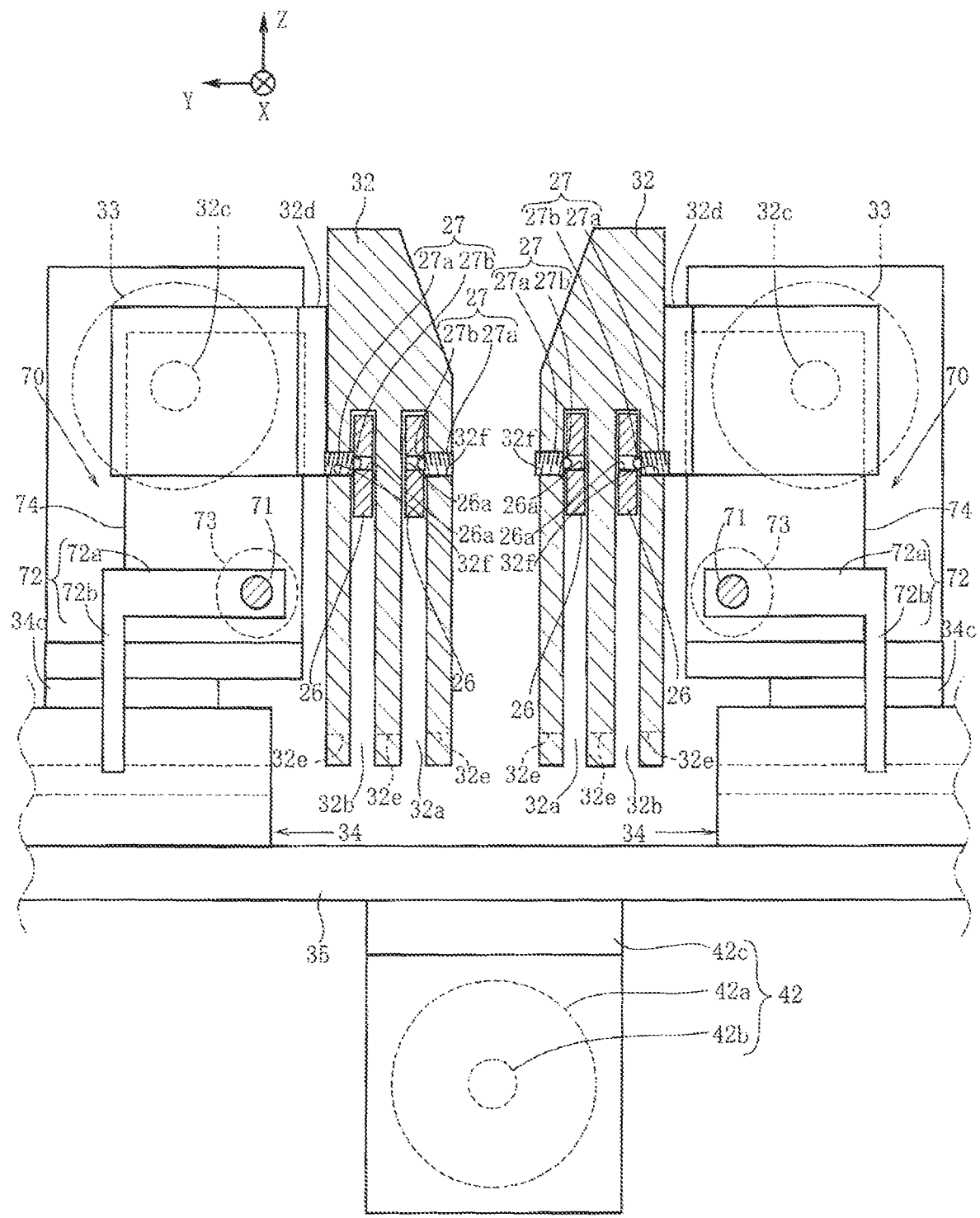
FIG. 16 is a sectional view taken along a line G-G in FIG. 11.

As shown in FIG. 16, the temporary fixing mechanism 27 is a ball screw 27 in which a threaded portion main body 27a is threaded to each of the pair of delivery jigs 32 and 32. In each of the pair of delivery jigs 32 and 32, a female screw hole 32f is formed so as to penetrate therethrough towards the pushing block 26 positioned at the bottom portion. The threaded portion main body 27a of the ball screw 27 is threaded to the female screw hole 32f. The pushing block 26 is formed with a dented portion or a round hall 26a into which a tip end ball 27b projecting out from the threaded portion main body 27a enters.

When the pushing blocks 26 that are respectively inserted into the slits 32a and 32b are positioned at the bottom portions in the slits 32a and 32b, the tip end balls 27b of the ball screws 27 each serving as the temporary fixing mechanism respectively enter the dented portions or the round halls 26a in the pushing blocks 26, and thereby, the pushing blocks 26 are kept at the bottom portions in the slits 32a and 32b.

On the other hand, as the pushing blocks 26 positioned at the bottom portions are biased so as to be moved towards opening portions of the slits 32a and 32b against a biasing force that causes the tip end balls 27b of the ball screws 27 to project out from the threaded portion main bodies 27a, the tip end balls 27b are retracted into the threaded portion main bodies 27a of the ball screws 27 and are released from the dented portions or the round halls 26a of the pushing blocks 26, and thereby, the movement of the pushing blocks 26 is allowed.

As shown in FIG. 13, on both sides of the pushing blocks 26 projecting out from both sides of the delivery jigs 32 and 32, linkage pieces 28 that link the pushing blocks 26 respectively inserted into the pair of slits 32a and 32b are respectively provided. Each of the linkage pieces 28 in this embodiment is a trapezoidal plate material formed with notches 28a into which end portions of the pushing blocks 26 can respectively enter. A cam follower 29 is pivotably supported on each of the linkage pieces 28 such that contacting piece 64, which will be described later, can come into contact therewith.

Figure 6:
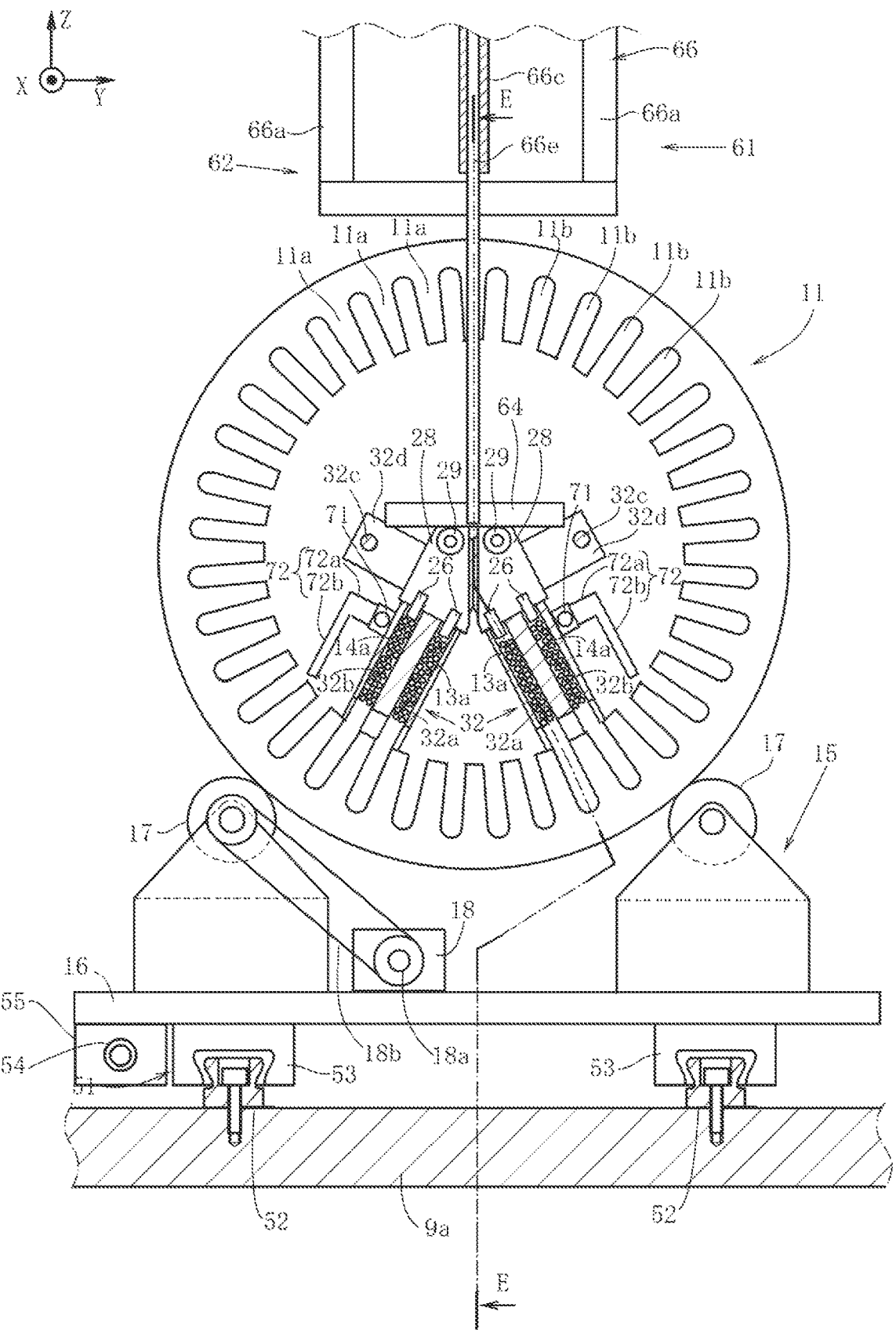
FIG. 6 is a sectional view showing a state in which the opening portions of the slits are caused to face the opening portions of the slots.
Figure 7:
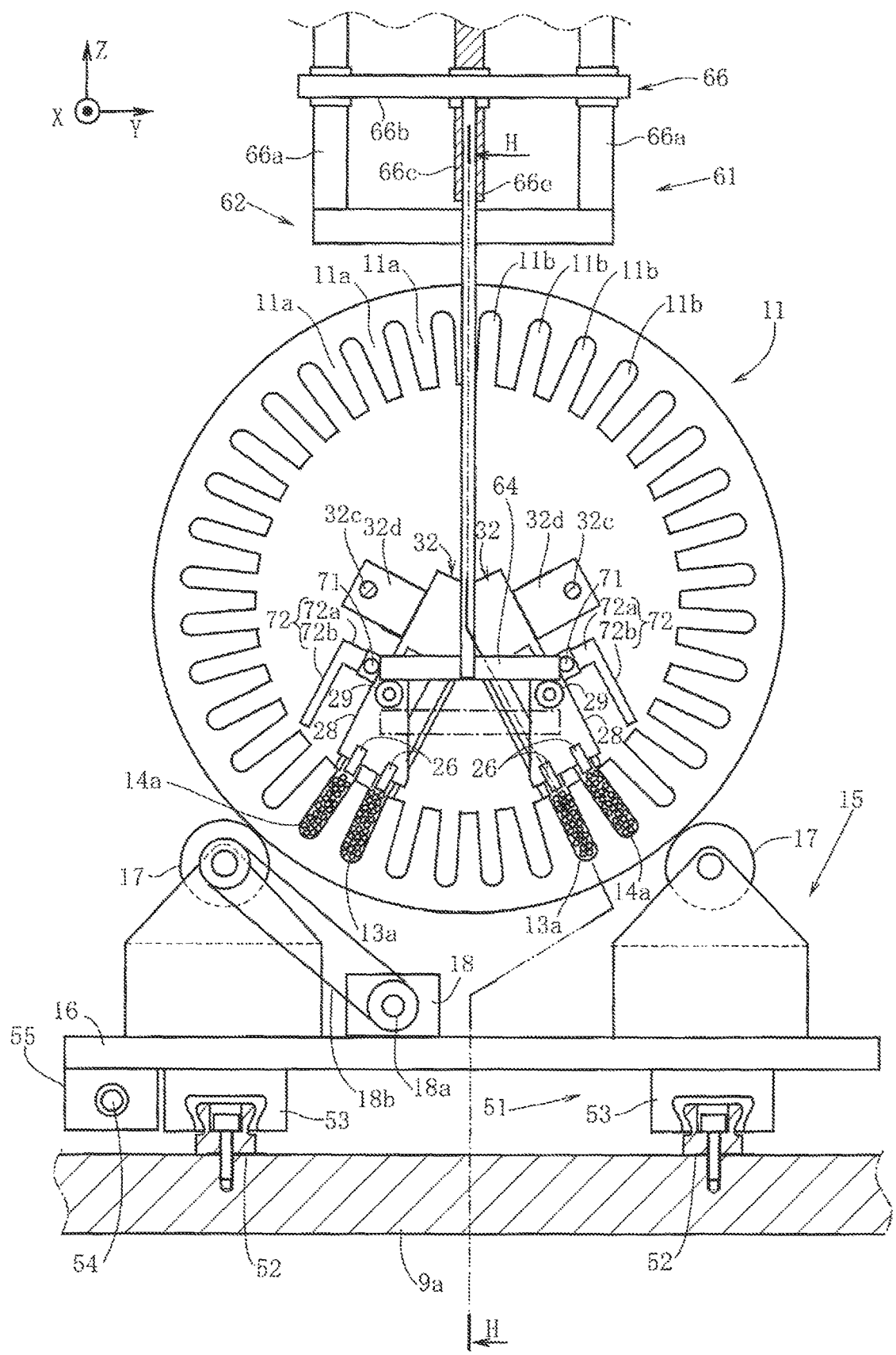
FIG. 7 is a sectional view showing a state in which the side portions of the coil are inserted into the slots.

As shown in FIGS. 8 and 9, the coil insertion device 9 is provided with a jig moving mechanism 40 serving as a jig moving means that moves the pair of delivery jigs 32 and 32 between a delivery position and an insertion position. The delivery position refers to, as shown in FIG. 8, the position at which the pair of side portions 13a and 14a of the coil 12 are inserted into the slits 32a and 32b of the pair of delivery jigs 32 and 32 (see FIGS. 1 to 4) at outside the stator core 11. The insertion position refers to the position at which, as shown in FIG. 9, the pair of delivery jigs 32 and 32 are introduced to the stator core 11, and at which, as shown in FIGS. 6 and 7, the opening portions of the slits 32a and 32b face opening portions of the slots 11b of the stator core 11 supported by the support tool 15.

Figure 11:
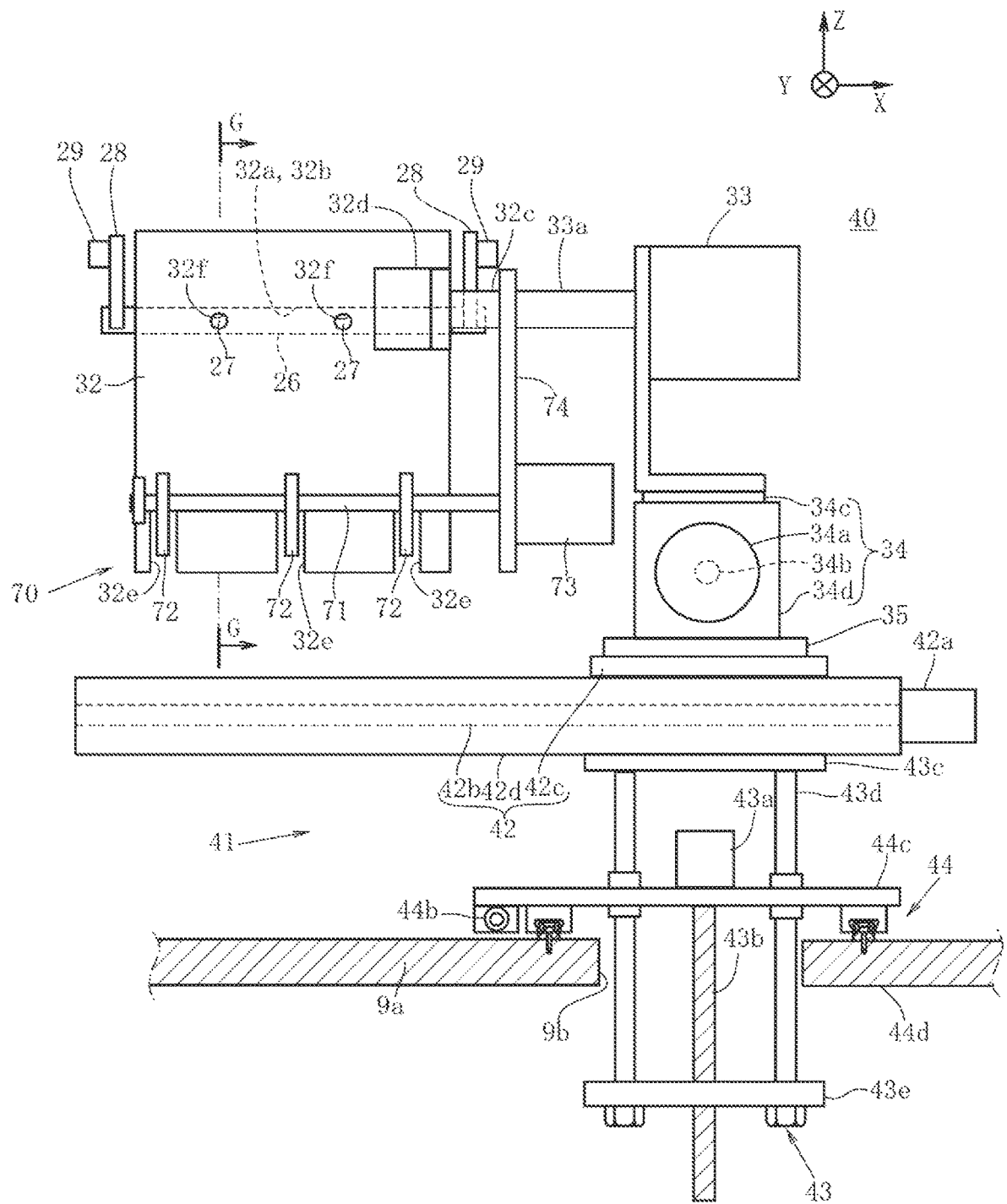
FIG. 11 is a sectional view taken along a line B-B in FIG. 8.
Figure 12:
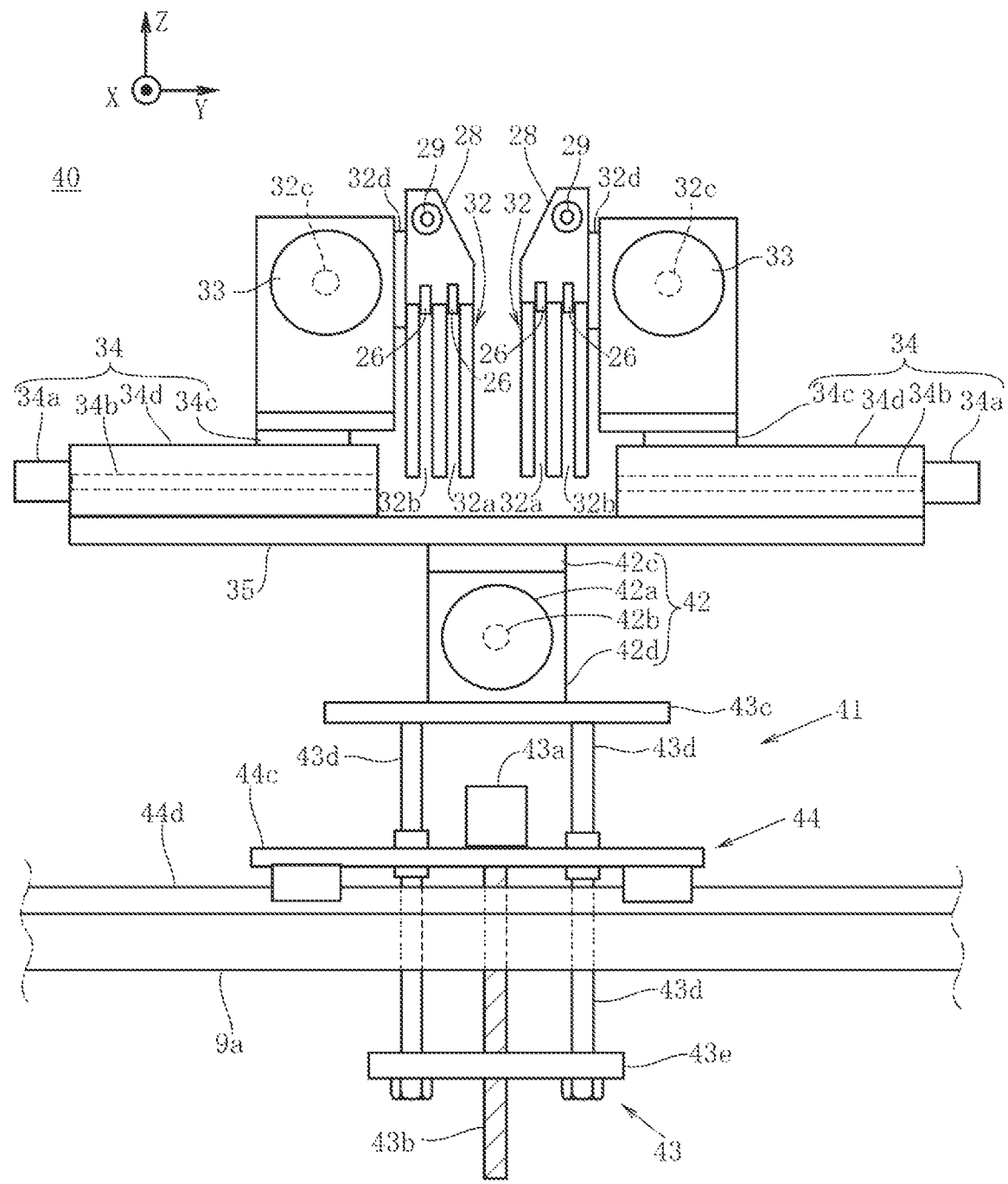
FIG. 12 is a diagram viewed from the arrow C in FIG. 8.

As shown in FIGS. 11 and 12, the jig moving mechanism 40 in this embodiment is provided with: a rotating mechanism 33 that rotates either one or both of the pair of delivery jigs 32 and 32 about a rotating shaft 32c that is parallel with the longitudinal direction of the slits 32a and 32b; an approach/separation mechanism 34 that moves the pair of delivery jigs 32 and 32 so as to be approached with/separated from each other; and a three-axial moving mechanism 41 that moves the approach/separation mechanism 34 and the rotating mechanism 33 in the three axial directions.

The rotating mechanism 33 are a pair of electric motors 33, and on the outer sides of the respective pair of delivery jigs 32 and 32, the rotating shafts 32c extending in parallel with the longitudinal direction of the slits 32a and 32b are respectively provided via L-shaped brackets 32d. The rotating shafts 32c are respectively provided coaxially with respect to respective rotating shafts 33a of the pair of electric motors 33 and 33. The pair of electric motors 33 are provided so as to correspond to the pair of delivery jigs 32 and 32, and both of the pair of delivery jigs 32 and 32 are rotated about the rotating shafts 32c that are parallel with the longitudinal direction of the slits 32a and 32b.

The approach/separation mechanism 34 is a pair of actuators 34 and 34 that allow approach/separation of the pair of electric motors 33 and 33, serving as the rotating mechanism 33, with/from each other. The actuators 34 and 34 are each provided with a ball screw 34b that is rotationally driven by a servomotor 34a and a follower 34c that is threadably engaged with the ball screw 34b and moves horizontally.

The pair of actuators 34 and 34 are provided on a movable stage 35 such that their housings 34d are aligned in a row in the Y axis direction. The electric motors 33 are respectively provided on the followers 34c of the pair of actuators 34 and 34 such that their rotating shafts 33a extend in the X axis direction so as to be parallel with each other. The pair of actuators 34 and 34 cause the pair of electric motors 33 and 33 to be approached with/separated from each other, thereby causing the pair of delivery jigs 32 and 32 provided on their rotating shafts 33a to be approached with/separated from each other.

The three-axial moving mechanism 41 is provided with: an X axis direction extension/contraction actuator 42 that moves the movable stage 35 in the X axis direction; a Z axis direction extension/contraction actuator 43 that moves the X axis direction extension/contraction actuator 42 in the Z axis direction; and a Y axis direction extension/contraction actuator 44 that moves the Z axis direction extension/contraction actuator 43 in the Y axis direction.

The Y axis direction extension/contraction actuator 44 is provided with a pair of rails 44d that are provided on the table 9a so as to extend in the Y axis direction, a movable stage 44c that is mounted on the rails 44d so as to be movable, a ball screw 44b that is provided along the rails 44d so as to be threadably engaged with the movable stage 44c, and a servomotor 44a that rotates the ball screw 44b.

The Z axis direction extension/contraction actuator 43 is provided with a plurality of rods 43d that are inserted through the movable stage 44c so as to be vertically movable and so as to extend in the Z axis direction, an up/down stage 43c that is mounted on an upper end of the rods 43d, a female screw plate 43e that is attached to a lower end of the rods 43d, a ball screw 43b that is threadably engaged with the female screw plate 43e and that is provided along the rods 43d so as to extend in parallel therewith, and a servomotor 43a that is provided on a movable stage 33c and that rotates the ball screw 43b.

Reference numeral 9b represents an elongated hole 9b that is formed so as to extend in the table 9a in the Y axis direction and through which the rods 43d are penetrated such that the movement of the rods 43d in the Y axis direction is allowed.

The X axis direction extension/contraction actuator 42 has the same configuration as that of an actuator 34 in the approach/separation mechanism. A follower 42c is attached so as to be movable in the X axis direction, and a housing 42d is attached to the up/down stage 43c of the Z axis direction extension/contraction actuator 43.

The coil insertion device 9 is provided with retaining mechanisms 70 serving as preventing means that are respectively provided on the pair of delivery jigs 32 and 32 and that prevent detachment of the side portions 13a and 14a that have been inserted into the slits 32a and 32b from the slits 32a and 32b.

As shown in FIGS. 11 and 16, the retaining mechanisms 70 in this embodiment are provided with shaft members 71 that are provided on outer surfaces of the pair of delivery jigs 32 and 32 so as to be parallel with the rotating shafts 32c, a plurality of hook members 72 that are provided on the shaft members 71 (the figures show a configuration in which three members are provided on one side), and actuators 73 that rotate the shaft members 71 together with the plurality of hook members 72.

The actuators 73 are motors and are attached to attachment plates 74 that are provided on the rotating shafts 33a of the electric motors 33 serving as the rotating mechanisms. Each of the delivery jigs 32 on which the hook members 72 are provided is formed with notches 32e that extend so as to cross entrance sides of the slits 32a and 32b.

As shown in FIG. 16, the hook members 72 in this embodiment are L-shaped flat plates and have attachment portions 72a and cover portions 72b. The attachment portions 72a are attached to the shaft members 71. As the shaft members 71 are rotated, the cover portions 72b enter the notches 32e, moved so as to cross the opening portions of the slits 32a and 32b as shown in FIG. 5, and prevent the side portions 13a and 14a that have been received in the slits 32a and 32b from falling off from the slits 32a and 32b.

Figure 15:
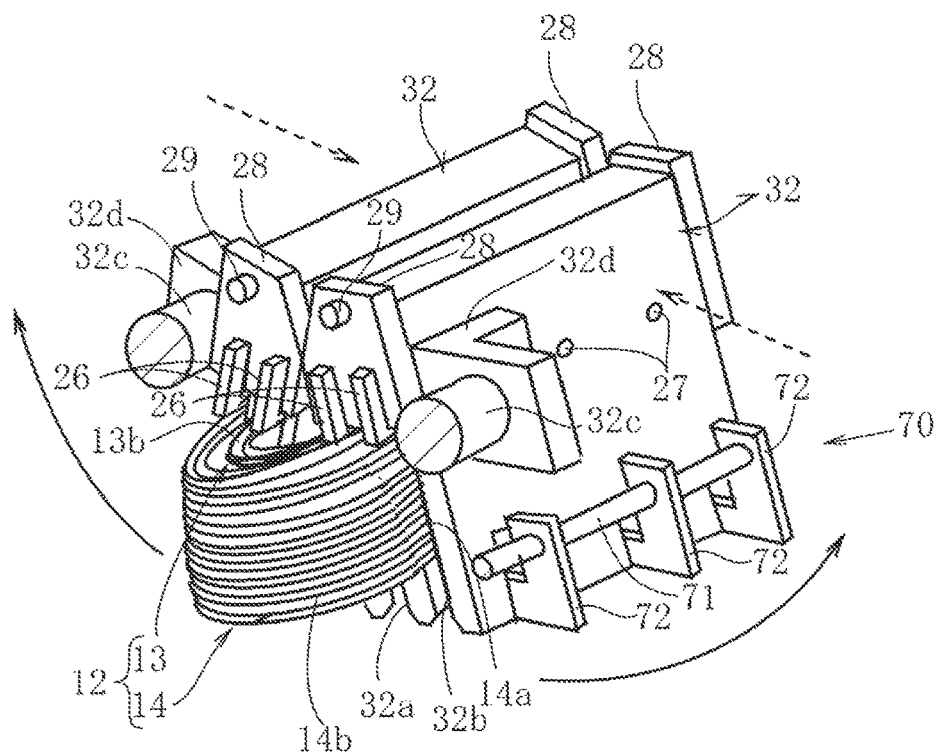
FIG. 15 is a perspective view showing a state in which the coil is deformed by rotating and moving the delivery jigs.

The rotating mechanism 33 and the approach/separation mechanism 34 in the jig moving mechanism 40 rotate the pair of delivery jigs 32 and 32 in which the side portions 13a and 14a have been received in the slits 32a and 32b so as not to be detachable, thereby causing the pair of delivery jigs 32 and 32 to be approached with/separated from each other. As shown in FIG. 15, as the jig moving mechanism 40 is driven, the pair of delivery jigs 32 and 32 are moved to an inclined position where the depth directions of the slits 32a and 32b intersect with each other, and thereby, the coil 12 is deformed.

As shown in FIG. 5, when the coil 12 is deformed, the rotating mechanisms 33 and 33 (see FIG. 8) adjust angle α1 for the slits 32a and 32b in the delivery jigs 32 so as to match with angle α2 for the slots 11b into which the pair of side portions 13a and 14a are to be inserted, and the approach/separation mechanism 34 (see FIG. 8) adjusts distances d1 and d2 between the opening portions of the slits 32a and 32b in the pair of delivery jigs 32 and 32 so as to match with distances D1 and D2 between the slots 11b into which the pair of side portions 13a and 14a are to be inserted.

In the above, in this embodiment in which the coil 12 consisting of the inner coil 13 and the outer coil 14 is used, the angle α2 for the slots 11b into which the side portions 13a and 14a are to be inserted is the angle α2 formed with the middle lines between two adjacent slots 11b of the stator core 11 into which the side portions 13a and 14a of the coil 12 are to be inserted (between slot 11b1 and slot 11b2 in FIG. 5).

The three-axial moving mechanism 41 of the jig moving mechanism 40 then further moves the pair of delivery jigs 32 and 32 such that, as shown in FIG. 6, at the insertion position at which the pair of delivery jigs 32 and 32 are introduced to the stator core 11, the opening portions of the slits 32a and 32b are caused to face the opening portions of the slots 11b into which the pair of side portions 13a and 14a are to be inserted.

As shown in FIGS. 1 to 4, the coil insertion device 9 is provided with a side portion inserting mechanism 61 serving as side portion inserting means that pushes out the side portions 13a and 14a of the coil 12 inserted into the slits 32a and 32b from the slits 32a and 32b to insert the side portions 13a and 14a into slots 11b of the stator core 11, the slots 11b facing the slits 32a and 32b.

The side portion inserting mechanism 61 has the pushing blocks 26 that has been pre-inserted into the slits 32a and 32b of the pair of delivery jigs 32 and 32 and a pushing block moving mechanism 62 serving as pushing block moving means that moves the pushing blocks 26 to the depth direction of the slits 32a and 32b. The pushing block moving mechanism 62 has the contacting pieces 64 that come to direct-contact or indirect-contact with end portions of the pushing blocks 26 projecting out from both sides of the delivery jigs 32 and 32 and a contacting piece moving mechanism 65 that is provided above the support tool 15 positioned at the entry position and that moves the pushing blocks 26 by moving the contacting pieces 64.

Figure 10:
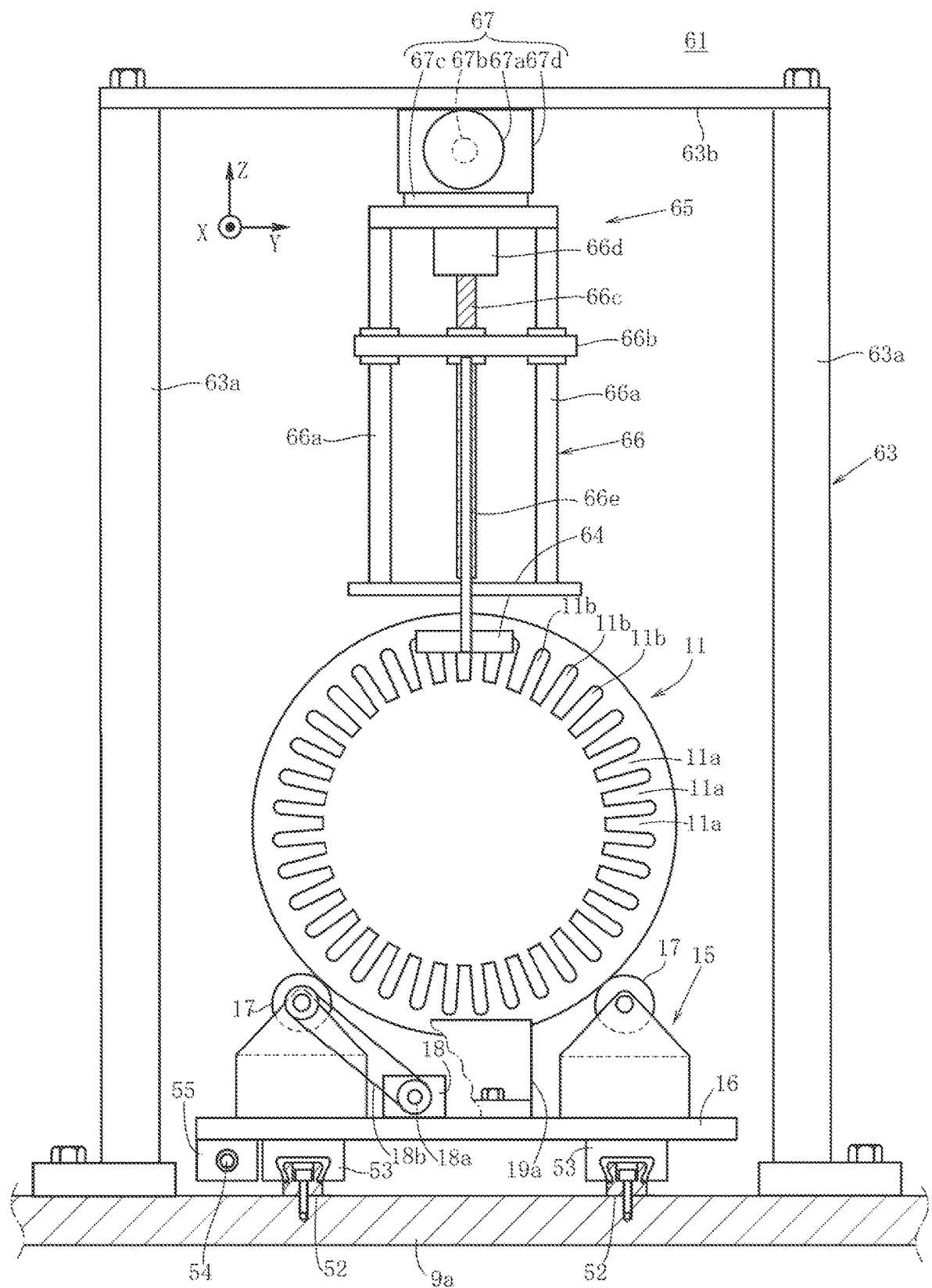
FIG. 10 is a sectional view taken along a line A-A in FIG. 8.

As shown in FIG. 10, on the table 9a, an archway member 63 is provided so as to cover the support tool 15 positioned at the entry position from the above. The archway member 63 has a pair of pillars 63a and 63a that are provided in upright positions such that the support tool 15 positioned at the entry position is located therebetween and a top plate 63b that is installed on upper ends of the pair of pillars 63a and 63a. The contacting piece moving mechanism 65 is provided on the top plate 63b.

As shown in FIGS. 1 to 4, the contacting piece moving mechanism 65 has a pair of up/down actuators 66 and 66 that moves the contacting pieces 64 up and down in the vertical direction at both ends of the support tool 15 in the axial direction of the stator core 11 and approach/separation actuators 67 that cause the pair of up/down actuators 66 and 66 to be approached with/separated from each other in the axial direction of the stator core 11.

The approach/separation actuator 67 has the same configuration as that of the actuator 34 that moves the electric motors 33, and a pair of housings 67d are attached to the top plate 63b so as to continuously extend in the X axis direction such that followers 67c that are threadably engaged with ball screws 67b rotated by servomotors 67a can be moved in the X axis direction. The up/down actuators 66 and 66 are respectively attached to the followers 67c of the pair of approach/separation actuators 67.

The up/down actuators 66 have: a pair of rods 66a that are respectively attached to the followers 67c at upper ends thereof so as to extend downward; up/down plates 66b through which the rods 66a are inserted such that the up/down plates 66b can be moved up/down; ball screws 66c that are provided in parallel with the rods 66a by being threadably engaged with the up/down plates 66b; and servomotors 66d that rotate the ball screws 66c.

The contacting pieces 64 are respectively provided on lower ends of vertical rods 66e that extend in the vertical direction and that are attached to the up/down plates 66b at their upper end portions, and the contacting pieces 64 extend in the horizontal direction orthogonal to the vertical rods 66e. The contacting pieces 64 are plate materials that extend in the horizontal direction and that come into contact with both ends of the pushing blocks 26 at their an upper edge or a lower edge. In a case in which the linkage pieces 28 are provided, the contacting pieces 64 come into contact with the cam followers 29 that are pivotably supported to the linkage pieces 28.

Figure 3:
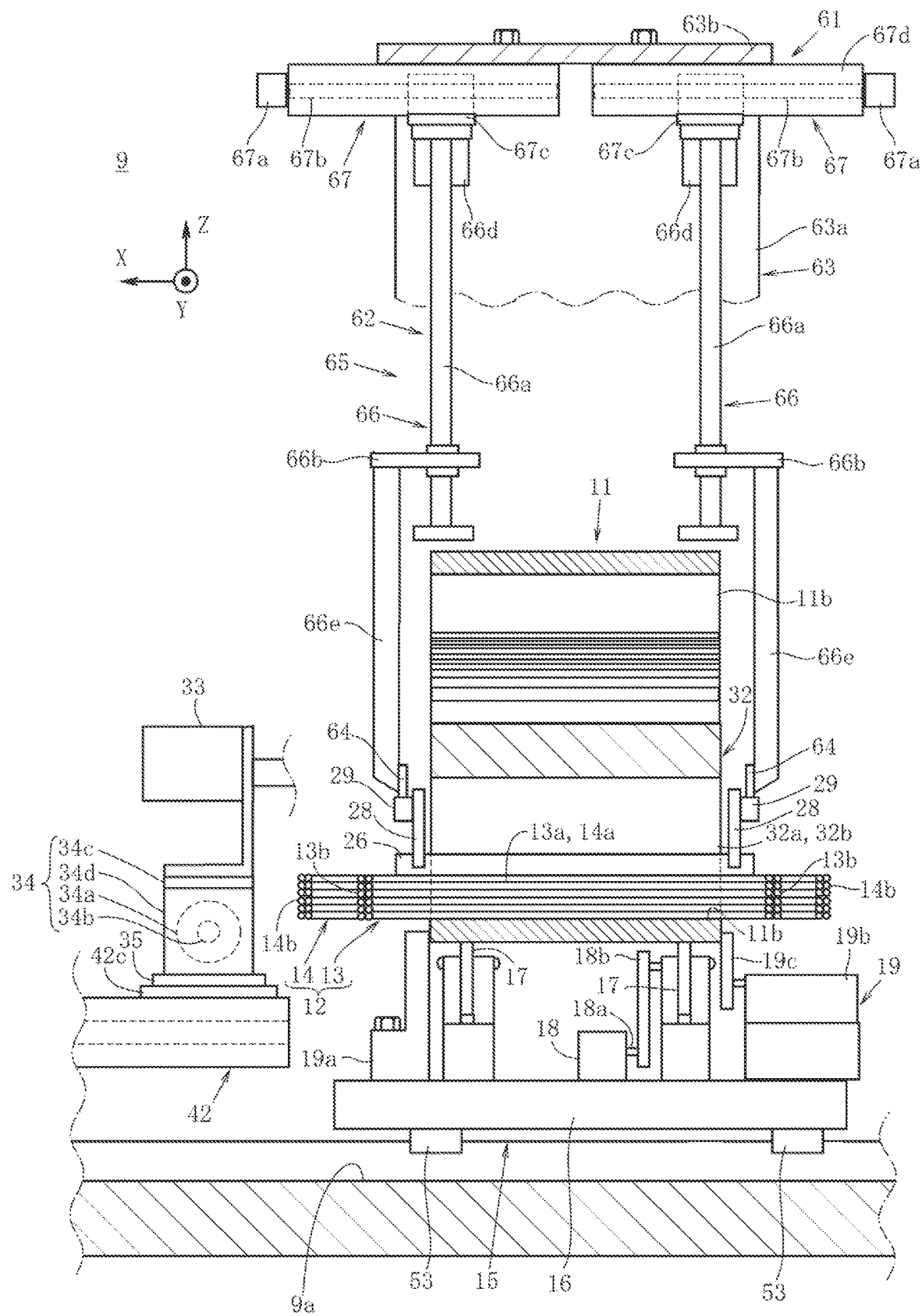
FIG. 3 is a sectional view taken along a line H-H in FIG. 7 in which the side portions of the coil are inserted into the slots.

As shown in FIG. 2, when the lower edges of the contacting pieces 64 come into contact with the both ends of the pushing blocks 26, as the contacting pieces 64 are moved downward, the pushing blocks 26 are also moved downward. As shown in FIG. 3, once the pushing blocks 26 reach the opening portions of the slits 32a and 32b, the side portions 13a and 14a of the coil 12 are pushed out from the slits 32a and 32b.

Figure 4:
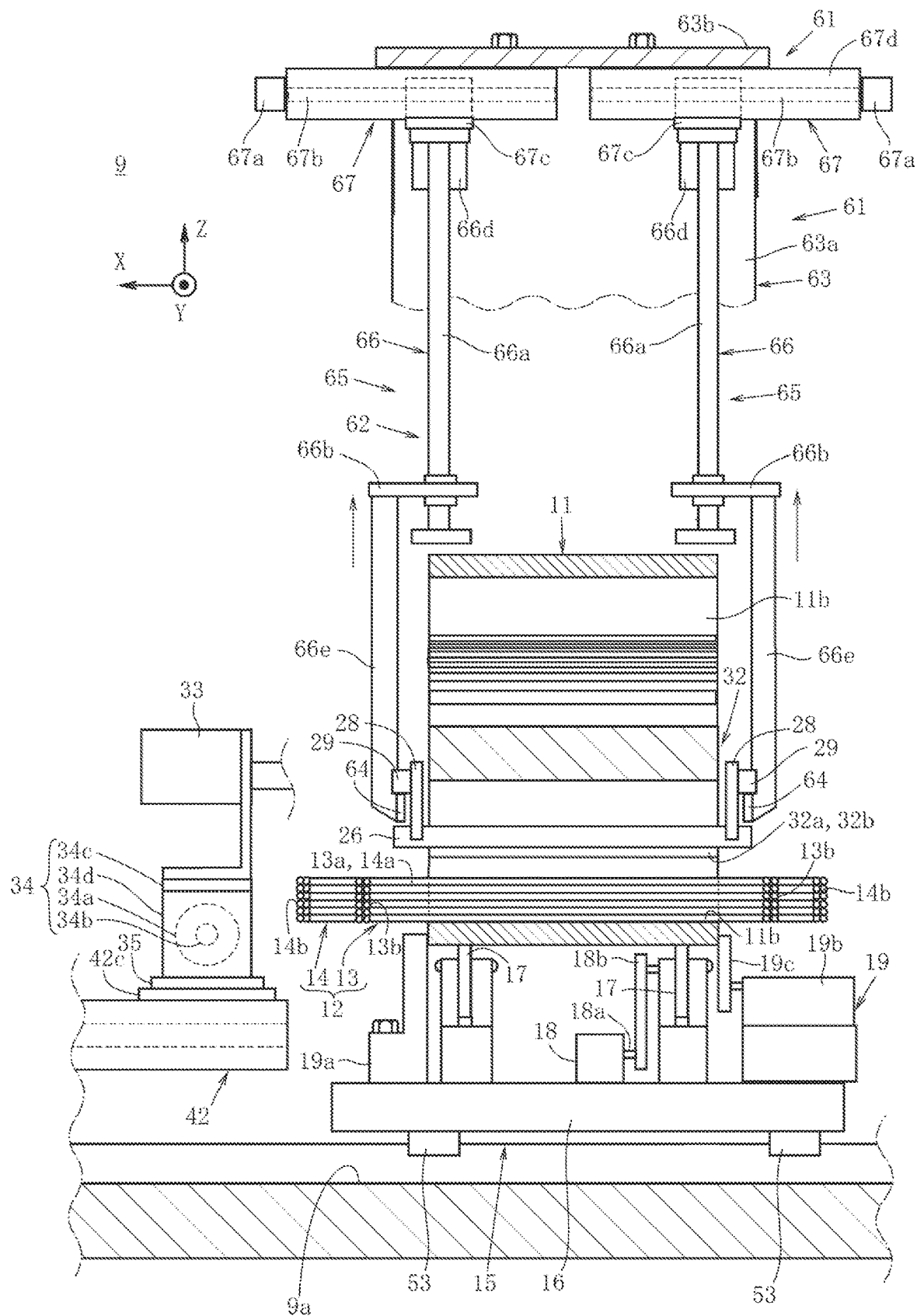
FIG. 4 is a sectional view showing a state in which pushing blocks are returned to depth portions in the slits.

On the other hand, as shown in FIG. 4, when the upper edges of the contacting pieces 64 come into contact with the both ends of the pushing blocks 26, as the contacting pieces 64 are moved upward, the pushing blocks 26 are also moved upward, and the pushing blocks 26 are returned to the bottom portions in the slits 32a and 32b.

As described above, the lower edges of the contacting pieces 64 form the pushing parts that move the pushing blocks 26 from the bottom portions in the slits 32a and 32b to the opening portions thereof, and the upper edges of the contacting pieces 64 form the pulling parts that move the pushing blocks 26 from the opening portions of the slits 32a and 32b to the bottom portions thereof.

Next, a coil insertion method according to this embodiment will be described.

The coil insertion method according to this embodiment includes: a delivery step of respectively inserting the pair of side portions 13a and 14a of the coil 12 into the slits 32a and 32b respectively formed in the pair of delivery jigs 32 and 32; a jig inserting step of introducing the pair of delivery jigs 32 and 32 to the inside of the stator core 11 to cause the opening portions of the slits 32a and 32b to face the opening portions of the slots 11b of the stator core 11 into which the pair of side portions 13a and 14a are to be inserted; and a side portion inserting step of pushing the side portions 13a and 14a of the coil 12 that have been inserted into the slits 32a and 32b out from the slits 32a and 32b to insert the side portions 13a and 14a into the corresponding slots 11b of the stator core 11.

In the delivery step, the pair of side portions 13a and 14a are respectively inserted into the slits 32a and 32b in which the pushing blocks 26 have been inserted into the bottom portions. In the side portion inserting step, the side portions 13a and 14a are pushed out from the slits 32a and 32b by moving the pushing blocks 26 from the bottom portions in the slits 32a and 32b to the opening portions.

The coil insertion method according to this embodiment is performed by using the coil insertion device 9. The operation of the coil insertion device 9 is automatically controlled by a controller (not shown).

Because the side portions 13a and 14a of the coil 12 are caused to be inserted into the slits 32a and 32b of the delivery jigs 32 and 32 in the delivery step, a coil forming step for obtaining the coil 12 is performed as a previous step thereof.

Because the side portions 13a and 14a of the coil 12 are pushed out from the slits 32a and 32b to insert the side portions 13a and 14a into the corresponding slots 11b of the stator core 11 in the side portion inserting step, a core supporting step of causing the support tool 15 to support the stator core 11 is performed as a previous step thereof.

Each step is described bellow in detail.

<Core Supporting Step>

In the core supporting step, the stator core 11 is caused to be supported by the support tool 15. Specifically, by using the core moving mechanism 51, the support tool 15 is moved to the mounting position shown in FIG. 8, and the stator core 11 is loaded on the plurality of pairs of the rollers 17 of the support tool 15 positioned at the mounting position. Then, the stator core 11 is clamped from both sides in the axial direction by the fixing device 19, and thereby, the stator core 11 is supported such that the rotation thereof is prohibited.

<Coil Forming Step>

In the coil forming step, as shown in FIG. 13, the coil 12 having the pair of side portions 13a and 14a that are parallel with each other is formed by winding the wire rod 8. In this embodiment, the wire winding device (not shown) is provided in a part 7 shown by one-dot chain line on the table 9a in FIGS. 8 and 9. The wire winding device forms the coil 12 consisting of the inner coil 13 and the outer coil 14 that surrounds the inner coil 13 from the outside.

As shown in FIG. 13, the inner coil 13 is formed to have the running-track shape having: the coil end portions 13b formed of the wire rod 8 suspended around the pair of inner winding molds 24a; and the side portions 13a formed of the wire rod 8 suspended between the pair of inner winding molds 24a. The outer coil 14 is formed to have the running-track shape having: the coil end portions 14b formed of the wire rod 8 suspended around the pair of outer winding molds 25a that cover the coil end portions 13b of the inner coil 13; and the side portions 14a formed of the wire rod 8 suspended between the pair of outer winding molds 25a.

Because the outer winding molds 25a are formed so as to cover the coil end portions 13b of the inner coil 13 from the outside, the outer coil 14 suspended between the outer winding molds 25a is formed to have the size that surrounds the inner coil 13 from the outside. The gap t2 between the respective side portions 13a and 14a of the inner coil 13 and the outer coil 14 matches with the gaps t1 between the slots 11b of the stator core 11 that are adjacent with each other in the circumferential direction into which the side portions 13a and 14a will be inserted subsequently (see FIG. 5).

<Delivery Step>

In the delivery step, the pair of side portions 13a and 14a of the coil 12 are respectively inserted into the slits 32a and 32b that are respectively formed in the pair of delivery jigs 32 and 32. Detailed description will be given below.

In this embodiment using the coil insertion device 9, as shown in FIG. 13, the pair of delivery jigs 32 and 32 are set so as to be parallel with each other, and the gap between the pair of delivery jigs 32 and 32 is adjusted to match with the gap between the side portions 13a and 14a of the coil 12.

Figure 14:
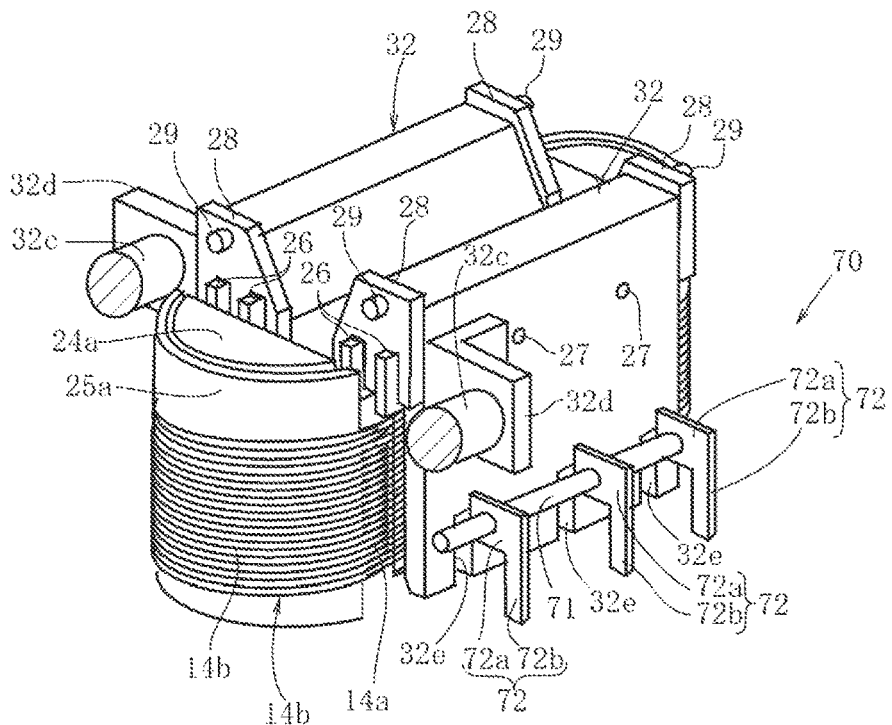
FIG. 14 is a perspective view showing a state in which the side portions of the coil are inserted into the slits of the delivery jigs.

Thereafter, the pair of delivery jigs 32 and 32 are moved by the jig moving mechanism 40 (see FIG. 8), and as shown in FIG. 14, the pair of side portions 13a and 14a are respectively inserted into the slits 32a and 32b of the pair of delivery jigs 32 and 32 in the state in which the pair of side portions 13a and 14a are parallel with each other.

In this embodiment, because the coil 12 consisting of the inner coil 13 and the outer coil 14 is used, in the delivery step, the pair of delivery jigs 32 and 32 that are respectively formed with both of the inner slits 32a into which the side portions 13a of the inner coil 13 are inserted and the outer slits 32b into which the side portions 14a of the outer coil 14 are inserted are used. The side portions 13a of the inner coil 13 and the side portions 14a of the outer coil 14 are inserted into the inner slits 32a and the outer slits 32b, respectively, in the state in which the side portions 13a and the side portions 14a are parallel with each other.

In addition, because the pair of delivery jigs 32 and 32 are provided with the retaining mechanisms 70 that prevent the side portions 13a and 14a, which have been received in the slits 32a and 32b, from being detached from the slits 32a and 32b, after the pair of side portions 13a and 14a are respectively inserted in parallel with each other into the slits 32a and 32b of the pair of delivery jigs 32 and 32, the shaft members 71 are rotated together with the hook members 72 by the actuators 73 of the retaining mechanisms 70 (see FIG. 11) to cause the cover portions 72b of the hook members 72 shown in FIG. 14 to enter the notches 32e. By doing so, the cover portions 72b are moved across the entrance sides of the slits 32a and 32b (see FIG. 5).

As described above, by the cover portions 72b, the side portions 13a and 14a that have been received in the slits 32a and 32b are prevented from falling off from the slits 32a and 32b. In this state, the three-axial moving mechanism 41 of the jig moving mechanism 40 moves the pair of delivery jigs 32 and 32 together with the coil 12 whose side portions 13a and 14a have been inserted, and thereby, the three-axial moving mechanism 41 allows the coil 12 to be removed from the inner winding molds 24a and the outer winding molds 25a.

<Jig Inserting Step>

In the jig inserting step, the pair of delivery jigs 32 and 32 are introduced to the inside of the stator core 11, and the opening portions of the slits 32a and 32b are caused to face the opening portions of the slots 11b of the stator core 11 into which the pair of side portions 13a and 14a are to be inserted.

In the above, in the delivery step, the pair of delivery jigs 32 and 32 are provided in parallel with each other. However, the slots 11b of the stator core 11 are formed in a radiating pattern. Therefore, in the jig inserting step, in order to cause the opening portions of the slits 32a and 32b to face the slots 11b of the stator core 11, a jig relatively moving step and the jig inserting step are performed. In the jig relatively moving step, the pair of delivery jigs 32 and 32 are relatively moved such that the slits 32a and 32b are angled so as to intersect in a similar manner as the slots 11b, and in the jig inserting step, the pair of delivery jigs 32 and 32 are introduced to the inside of the stator core 11 such that the opening portions of the slits 32a and 32b are caused to face the opening portions of the slots 11b. Detailed description will be given below.

<Jig Relatively Moving Step>

In the jig relatively moving step, as shown in FIG. 15, either one or both of the pair of delivery jigs 32 and 32 is/are rotated as shown by solid line arrows about the rotating shafts 32c that are parallel with the longitudinal direction of the slits 32a and 32b, and thereby, the slits 32a and 32b are adjusted so as to match with the angle α2 of the slots 11b into which the pair of side portions 13a and 14a are to be inserted while deforming the coil end portions 13b and 14b of the coil 12 (see FIG. 5).

In addition, in the jig relatively moving step, as shown in FIG. 5, the distances d1 and d2 for the opening portions of the slits 32a and 32b of the pair of delivery jigs 32 and 32 are adjusted so as to match with the distances D1 and D2, respectively, for the slots 11b into which the pair of side portions 13a and 14a are to be inserted.

As shown in FIG. 15, in this embodiment in which the L-shaped brackets 32d are provided in the depth direction of the slits 32a and 32b, by reducing a distance between the pair of electric motors 33 by the approach/separation mechanism 34 (see FIG. 8), the pair of delivery jigs 32 and 32 approach with each other as shown by broken line arrows in FIG. 15, and the coil 12 is deformed such that the coil end portions 13b and 14b of the coil 12 are mainly deformed.

As described above, as shown in FIG. 5, the distances d1 and d2 between the opening portions of the slits 32a and 32b are changed so as to match with the distances D1 and D2 for the slots 11b into which the pair of side portions 13a and 14a, which have been inserted into the slits 32a and 32b, are to be inserted.

\<Jig Inserting Step\>

In the jig inserting step, the pair of delivery jigs 32 and 32 are introduced to the inside of the stator core 11, and as shown in FIG. 6, the opening portions of the slits 32*a* and 32*b* are caused to face the opening portions of the slots 11*b*. Detailed description will be given below.

In the jig inserting step, the support tool 15 on which the stator core 11 is loaded is positioned at the insertion position shown in FIG. 9 by the core moving mechanism 51, and the pair of delivery jigs 32 and 32 are moved by the jig moving mechanism 40, and thereby, as shown in FIG. 5, the pair of delivery jigs 32 and 32 are introduced to the stator core 11 loaded on the support tool 15.

At the insertion position at which the pair of delivery jigs 32 and 32 have been introduced to the stator core 11, the three-axial moving mechanism 41 (see FIG. 8) further moves the pair of delivery jigs 32 and 32 such that, as shown in FIG. 6, the opening portions of the slits 32*a* and 32*b* are caused to face the opening portions of the slots 11*b* into which the pair of side portions 13*a* and 14*a*, which have been inserted into the slits 32*a* and 32*b*, are to be inserted.

Thereafter, the actuators 73 of the retaining mechanisms 70 are driven to rotate the shaft members 71, and the cover portions 72*b* of the hook members 72 are dislocated from the notches 32*e*, and thereby, the entrance sides of the slits 32*a* and 32*b* are opened.

\<Side Portion Inserting Step\>

In the side portion inserting step, the side portions 13*a* and 14*a* of the coil 12 that have been inserted into the slits 32*a* and 32*b* are push out from the slits 32*a* and 32*b* and the side portions 13*a* and 14*a* are inserted into the corresponding slots 11*b* of the stator core 11. Detailed description will be given below.

In this embodiment using the coil insertion device 9, the side portion inserting step is performed by the side portion inserting mechanism 61. As shown in FIGS. 2 and 6, by moving the contacting pieces 64 downward from the above towards the end portions of the pushing blocks 26 projecting out from both sides of the delivery jigs 32 and 32, i.e. towards the cam followers 29 provided on the linkage pieces 28 in this embodiment in which the linkage pieces 28 are provided on the end portions of the pushing blocks 26, the lower edges of the contacting pieces 64 are brought into contact with the cam followers 29.

Thereafter, the contacting pieces 64 are further moved downward, and thereby, the pushing blocks 26 that are inserted into the slits 32*a* and 32*b* of the delivery jigs 32 and 32 being inclined are moved from the bottom portions to the opening portions in the slits 32*a* and 32*b*. In this embodiment, because the contacting pieces 64 are brought into contact with the cam followers 29 provided on the linkage pieces 28, the cam followers 29 move the pushing blocks 26 by being rotated along the lower edges of the contacting pieces 64. Therefore, even if the delivery jigs 32 and 32 are inclined, the movement of the pushing blocks 26 is prevented from being interfered.

In addition, the pushing blocks 26 are temporary fixed at the bottom portions in the slits 32*a* and 32*b* by the ball screw 27 serving as the temporary fixing mechanism. However, the temporal fixing is released as the contacting pieces 64 are moved down, and the pushing blocks 26 in contact with the contacting pieces 64 are moved towards the opening portions of the slits 32*a* and 32*b*. As shown in FIGS. 3 and 7, the pushing blocks 26 being moved toward the opening portions then cause the side portions 13*a* and 14*a* of the coil 12, which have been inserted into the slits 32*a* and 32*b*, to be pushed out from the slits 32*a* and 32*b* and to be respectively inserted to the corresponding slots 11*b*.

At this time, as shown in FIG. 1, because the pushing block moving mechanism 62 has the up/down actuators 66 for moving the contacting pieces 64 up/down on both sides of the delivery jigs 32 independently, it is preferable that the contacting pieces 64 on the both sides of the delivery jigs 32 be moved downward at different timings such that the pushing blocks 26 be moved from the bottom portions to the opening portions in the slits 32*a* and 32*b* in a state in which the pushing blocks 26 are inclined with respect to the slits 32*a* and 32*b*.

By performing the movement of the pushing blocks 26 from the bottom portions to the opening portions in the slits 32*a* and 32*b* in a state in which the pushing blocks 26 are inclined with respect to the slits 32*a* and 32*b*, the side portions 13*a* and 14*a* of the coil 12 are moved from the slits 32*a* and 32*b* to the slots 11*b* sequentially in the longitudinal direction. Therefore, compared with a case in which the whole parts of the side portions 13*a* and 14*a* across the longitudinal direction are moved from the slits 32*a* and 32*b* to the slots 11*b* at the same time, it is possible to reduce a resistance for the movement.

In addition, by moving the pushing blocks 26 that have been inserted into the slits 32*a* and 32*b* in advance and that have been positioned at the bottom portions from the bottom portions to the opening portions in the slits 32*a* and 32*b*, the side portions 13*a* and 14*a* of the coil 12 are pushed out from the slits 32*a* and 32*b*, and therefore, the moving directions of the pushing blocks 26 and the moving directions of the side portions 13*a* and 14*a* coincide with each other. Therefore, the pushing blocks 26 and the side portions 13*a* and 14*a* are prevented from being rubbed with each other, and thus, it is possible to prevent damage of the wire rod 8 due to the rubbing with the pushing blocks 26.

In addition, because the moving directions of the pushing blocks 26 and the moving directions of the side portions 13*a* and 14*a* coincide with each other, the wire rod 8 forming the side portions 13*a* and 14*a* being pushed out by the pushing blocks 26 (see FIG. 13) are prevented from being disordered in the longitudinal direction. Therefore, a degree of alignment of the wire rod 8 forming the side portions 13*a* and 14*a* is not deteriorated, and so, it is possible to insert the side portions 13*a* and 14*a* of the coil 12 into the slots 11*b* of the stator core 11 without deteriorating the degree of alignment.

In other words, for the side portions 13*a* and 14*a* that are inserted into the corresponding slots 11*b* by being pushed out from the slits 32*a* and 32*b*, the side portions 13*a* and 14*a* are moved while the state of the wire rod 8 that have been inserted into the slits 32*a* and 32*b* are maintained and inserted into the slots 11*b* without changing the state. Therefore, it is possible to insert the side portions 13*a* and 14*a* formed of the normal wound wire rod 8 into the slots 11*b* of the stator core 11 without changing the state.

In this embodiment, the coil 12 consisting of the inner coil 13 and the outer coil 14 is used, and if they are wound normally, the coil 12 is delivered without changing its state. Therefore, it is possible to insert the side portions 13*a* and 14*a* in the aligned state into the slots 11*b* of the stator core 11 without changing the state. Therefore, a space factor for the wire rod 8 in the slots 11*b* can be improved, and so, it is possible to achieve the increase in efficiency and the reduction in the size for a power generator or a motor employing the stator 10.

After the side portions 13*a* and 14*a* of the coil 12 are inserted into the slots 11*b* of the stator core 11, the pushing blocks 26 are returned to the bottom portions in the slits 32*a* and 32b, are temporary fixed at the bottom portions by the temporary fixing mechanisms 27 (see FIG. 16), and are made ready for a following insertion of the coil 12. When the coil insertion device 9 is used, the return of the pushing blocks 26 is performed by the side portion inserting mechanism 61. For the return of the pushing blocks 26, detailed description will be given below.

As shown in FIG. 4, the upper edges of the contacting pieces 64 are, from the below, brought into contact with the end portions of the pushing blocks 26 projecting out from both sides of the delivery jigs 32 and 32, i.e. brought into contact with the cam followers 29 provided on the linkage pieces 28 in this embodiment in which the linkage pieces 28 are provided on the end portions of the pushing blocks 26. Thereafter, by further moving the contacting pieces 64 upward, the pushing blocks 26 pushed up by the contacting pieces 64 are returned to the bottom portions in the slits 32a and 32b, and thereby, the pushing blocks 26 are made ready for the following insertion of the coil 12 by being temporary fixed again at the bottom portions in the slits 32a and 32b by the ball screw 27 serving as the temporary fixing mechanism.

Because the stator 10 is manufactured by assembling the plurality of coils 12 to the single stator core 11, it is preferable to repeat the respective steps described above while rotating the stator core 11 and changing the slots 11b that come to face the opening portions of the slits 32a and 32b of the pair of delivery jigs 32 and 32.

The rotation of the stator core 11 is performed by rotating the rollers 17 of the support tool 15 by the motor 18 in a state in which the clamping of the stator core 11 by the fixing device 19 is released.

As described above, by repeating the respective steps described above upon changing the slots 11b facing the opening portions of the slits 32a and 32b, as shown in FIG. 19, it is possible to assemble the plurality of coils 12 to the single stator core 11.

In the above-mentioned embodiment, a description has been given of the retaining mechanisms 70 having the hook members 72. However, as long as the detachment from the slits 32a and 32b of the side portions 13a and 14a that have been inserted into the slits 32a and 32b can be prevented, the configuration of the retaining mechanisms 70 is not limited thereto. For example, as long as the detachment of the side portions 13a and 14a from the slits 32a and 32b is not caused, the retaining mechanisms 70 may not necessarily be provided, and even if the retaining mechanisms 70 is provided, a configuration without the hook members 72 may be employed.

In addition, in the above-mentioned embodiment, a case in which the contacting pieces 64 are each formed of a flat plate has been described. However, as long as the pushing blocks 26 coming into direct-contact or indirect-contact therewith can be moved, the contacting pieces 64 are not limited to the flat plates. For example, the contacting pieces 64 having an L-shaped cross-section as shown in FIG. 20 may be used, and the contacting pieces 64 having the U-shaped cross-section as shown in FIG. 21 may also be used.

Figure 20:
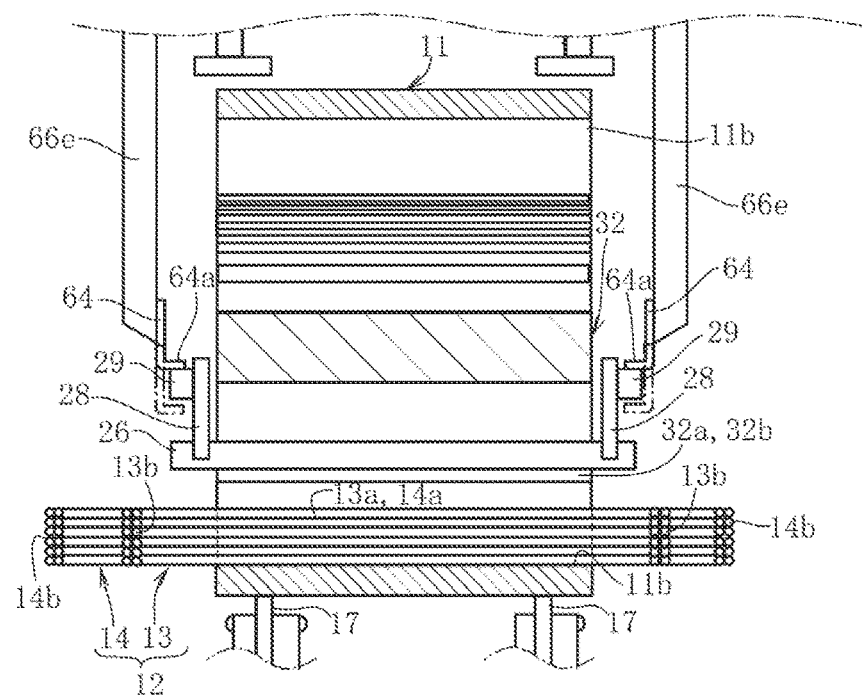
FIG. 20 is a sectional view showing a pushing block moving mechanism, in which contacting pieces have L-shaped cross-section, and is a diagram corresponding to FIG. 4.

By using the contacting pieces 64 having the L-shaped cross-section as shown in FIG. 20, horizontal portions 64a that are parallel with the horizontal surface come into contact with the both ends of the pushing blocks 26, or alternatively, in a case in which the linkage pieces 28 are provided, the horizontal portions 64a come into contact with the cam followers 29 that are pivotably supported to the linkage pieces 28. In this case, because lower surfaces of the horizontal portions 64a may be used to move the pushing blocks 26 downward, these lower surfaces form the pushing parts that move the pushing blocks 26 from the bottom portions to the opening portions in the slits 32a and 32b, and by shown by one-dot chain lines, because upper surfaces of the horizontal portions 64a may be used to move the pushing blocks 26 upward, these upper surfaces form the pulling parts that move the pushing blocks 26 from the opening portions to the bottom portions of the slits 32a and 32b.

Figure 21:
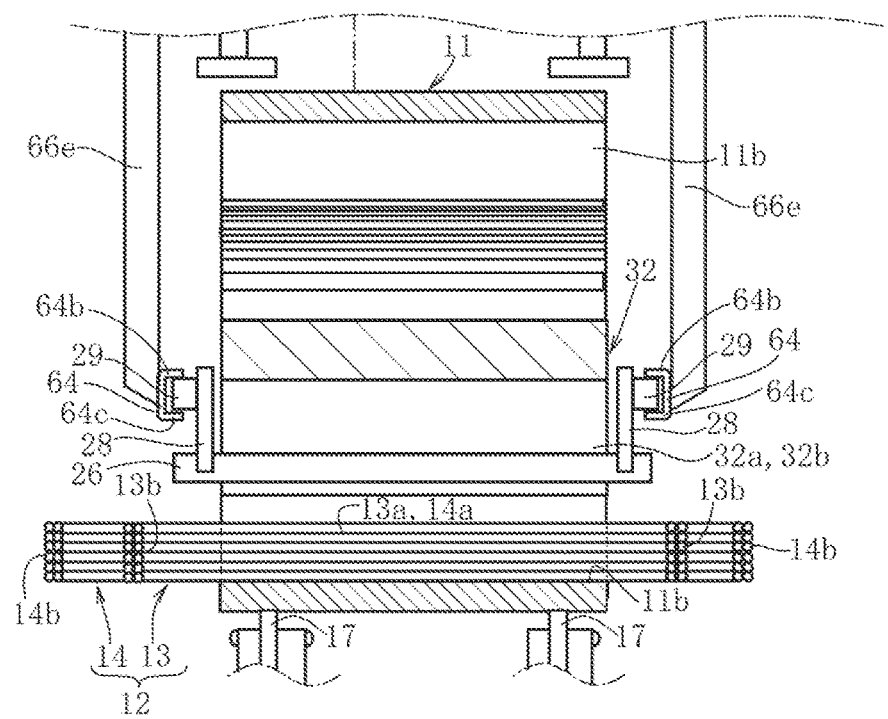
FIG. 21 is a sectional view showing the pushing block moving mechanism, in which the contacting pieces have U-shaped cross-section, and is a diagram corresponding to FIG. 4.
Figure 22:
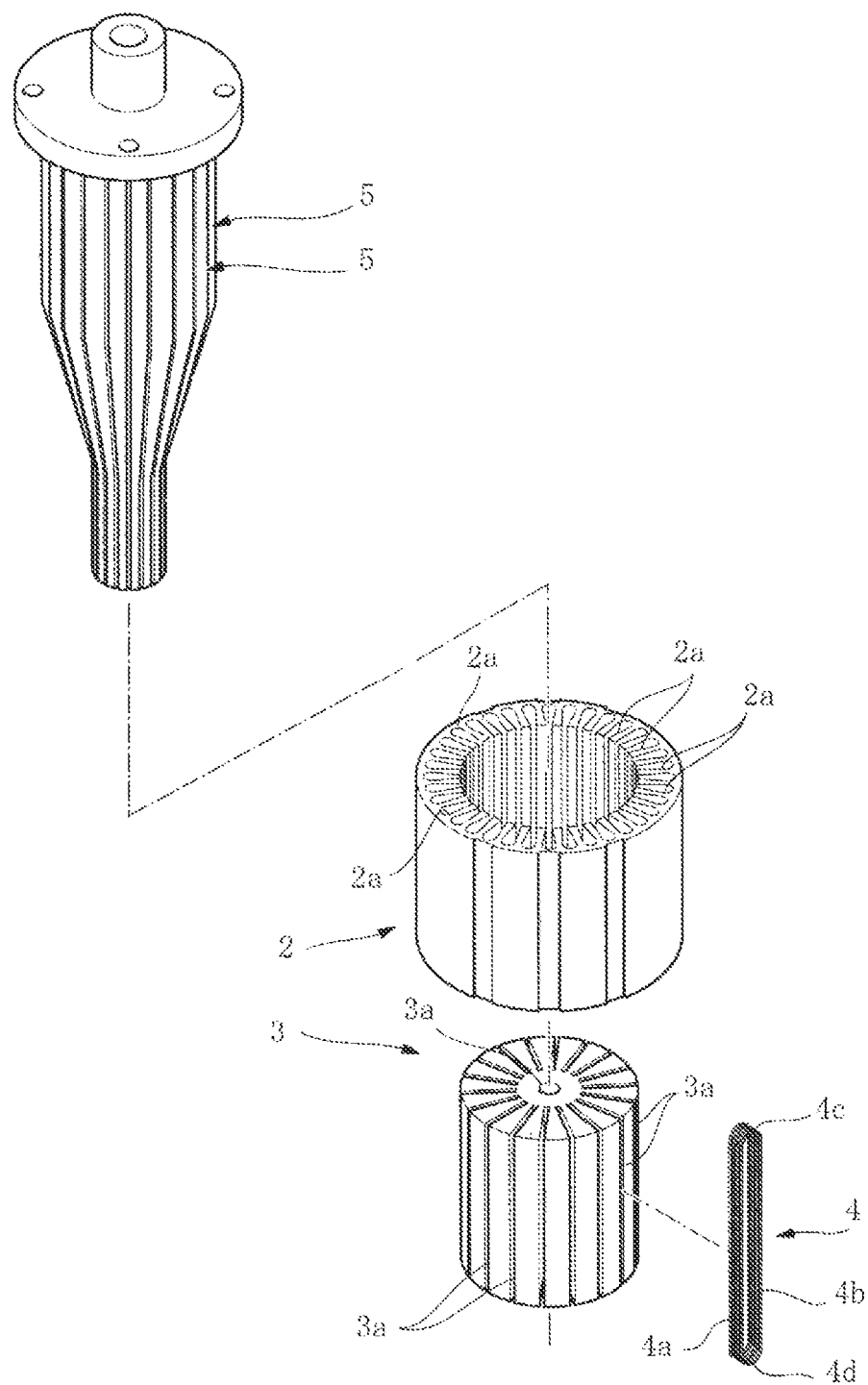
FIG. 22 is an exploded perspective view showing a conventional method for inserting the side portions of the coil into the respective slots of the stator core.

In addition, by using the contacting pieces 64 having the U-shaped cross-section as shown in FIG. 21, upper and lower horizontal plate portions 64b and 64c catch the end portions of the pushing blocks 26, or in a case in which the linkage pieces 28 are provided, catch the cam followers 29 that are pivotably supported to the linkage pieces 28 from both sides in the vertical direction. In this case, the upper horizontal plate portions 64b form the pushing parts that move the pushing blocks 26 from the bottom portions to the opening portions in the slits 32a and 32b, and the lower horizontal plate portions 64c form the pulling parts that move the pushing blocks 26 from the opening portions to the bottom portions of the slits 32a and 32b.

By using the contacting pieces 64 having the U-shaped cross-section show in FIG. 21, and by using the upper and lower horizontal plate portions 64b and 64c to catch the end portions of the pushing blocks 26 or the cam followers 29 from the both sides in the vertical direction, it is possible to move the pushing blocks 26 from the bottom portions to the opening portions in the slits 32a and 32b, and soon after, from the opening portions to the bottom portions only by moving the contacting pieces 64 vertically.

According to the embodiment described above, the following advantages are obtained.

The pushing blocks 26 are inserted into the slits 32a and 32b in advance, and the side portions 13a and 14a of the coil 12 are pushed out from the slits 32a and 32b by moving the pushing blocks 26 from the bottom portions to the opening portions in the slits 32a and 32b, and thereby, the moving directions of the pushing blocks 26 and the moving directions of the side portions 13a and 14a coincide with each other. Therefore, the pushing blocks 26 and the side portions 13a and 14a are prevented from being rubbed with each other, and so, it is possible to prevent damage of the side portions 13a and 14a due to the rubbing.

In addition, because the moving directions of the pushing blocks 26 and the moving directions of the side portions 13a and 14a coincide with each other, the wire rods 8 forming the side portions 13a and 14a that are pushed out by the pushing blocks 26 are prevented from being disordered from each other in the longitudinal direction. Therefore, the deterioration of the degree of alignment of the wire rods 8 forming the side portions 13a and 14a is prevented, and so, it is possible to insert the side portions 13a and 14a of the coil 12 into the slots 11b of the stator core 11 without deteriorating the degree of alignment.

Embodiments of this invention were described above, but the above embodiments are merely examples of applications of this invention, and the technical scope of this invention is not limited to the specific constitutions of the above embodiments.

This application claims priority based on Japanese Patent Application No. 2019-88810 filed with the Japan Patent Office on May 9, 2019, the entire contents of which are incorporated into this specification.

The invention claimed is:

1. A coil insertion device comprising:
   a pair of delivery jigs each respectively formed with a pair of slits into which a pair of side portions of a coil that are parallel with each other can be inserted, the delivery jigs being movable to an inside of a stator core and configured such that an angle between the slits of the pair of delivery jigs can be changed;
   a side portion inserting mechanism configured to push out the side portions inserted into the slits of the pair of delivery jigs from the slits to insert the side portions into slots of the stator core, the slots facing the slits, wherein
   the side portion inserting mechanism has:
   pushing blocks inserted into the slits of the pair of delivery jigs; and
   a pushing block moving mechanism configured to move the pushing blocks in a depth direction of the slits to push out the side portions inserted into the slits.

2. The coil insertion device according to claim 1, further comprising
   retaining mechanisms having cover portions respectively provided on the pair of delivery jigs, the retaining mechanisms being configured to prevent detachment of the side portions inserted into the slits from the slits.

3. The coil insertion device according to claim 1, further comprising
   temporary fixing mechanisms having ball screws respectively provided on the pair of delivery jigs, the temporary fixing mechanisms being configured to temporary fix the pushing blocks at bottom portions of the slits.

4. The coil insertion device according to claim 1, wherein
   the pushing blocks are inserted into the slits so as to project out from both sides of the delivery jigs,
   the pushing block moving mechanism has:
   contacting pieces configured to come into direct-contact or indirect-contact with end portions of the pushing blocks projecting out from the both sides of the delivery jigs; and
   a contacting piece moving mechanism having an actuator configured to move the contacting pieces to move the pushing block.

5. The coil insertion device according to claim 4, wherein
   the contacting piece moving mechanism is configured to move the contacting pieces on the both sides of the delivery jigs at different timings.

6. The coil insertion device according to claim 4, wherein
   the contacting pieces each have: a pushing part configured to move the pushing blocks from the bottom portions to opening portions of the slits; and a pulling part configured to move the pushing blocks from the opening portions to the bottom portions.

7. The coil insertion device according to claim 4, wherein
   the pair of slits are formed in each of the delivery jigs so as to form predetermined gaps,
   a linkage piece configured to link the pushing blocks respectively inserted into the pairs of slits are provided on each of the pair of delivery jigs,
   the linkage piece is configured to link the end portions of the pushing blocks projecting out from the delivery jigs, and
   the linkage piece is provided with a cam follower with which the contacting pieces come into contact.

8. A coil insertion method comprising:
   a delivery step respectively inserting a pair of side portions of a coil into a pair of slits each respectively formed in a pair of delivery jigs, the delivery jigs being configured such that an angle between the slits of the pair of delivery jigs can be changed;
   a jig inserting step of introducing the pair of delivery jigs to an inside of a stator core to cause opening portions of the slits to face opening portions of slots of the stator core; and
   a side portion inserting step of pushing the side portions of the coil that have been inserted into the slits of the pair of delivery jigs out from the slits to insert the side portions into the slots of the stator core, wherein
   in the delivery step, the pair of side portions are respectively inserted into the slits in which pushing blocks have been inserted into bottom portions, and
   in the side portion inserting step, the side portions are pushed out from the slits by moving the pushing blocks from the bottom portions to the opening portions in the slits to push out the side portions inserted into the slits.

9. The coil insertion method according to claim 8, wherein
   the movement of the pushing blocks from the bottom portions to the opening portions in the slits is performed in a state in which the pushing blocks are inclined with respect to the slits.

* * * * *